(12) United States Patent
Adams et al.

(10) Patent No.: US 9,292,314 B2
(45) Date of Patent: *Mar. 22, 2016

(54) METHOD AND SYSTEM FOR CONTROLLING SYSTEM SETTINGS OF A COMPUTING DEVICE

(71) Applicant: BlackBerry Limited, Waterloo (CA)

(72) Inventors: Neil Patrick Adams, Waterloo (CA); Sean Alexander Courtney, Hamilton (CA); Alexander Truskovsky, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 2 days.

This patent is subject to a terminal disclaimer.

(21) Appl. No.: 14/339,723

(22) Filed: Jul. 24, 2014

(65) Prior Publication Data

US 2015/0019857 A1 Jan. 15, 2015

Related U.S. Application Data

(63) Continuation of application No. 13/336,038, filed on Dec. 23, 2011, now Pat. No. 8,799,634.

(51) Int. Cl.
*G06F 1/24* (2006.01)
*G06F 9/445* (2006.01)
(Continued)

(52) U.S. Cl.
CPC ............ *G06F 9/44505* (2013.01); *G06F 21/53* (2013.01); *G06F 21/54* (2013.01); *G06F 21/602* (2013.01); *G06F 2221/2149* (2013.01)

(58) Field of Classification Search
USPC .............. 713/1, 2, 100, 156, 161, 182
See application file for complete search history.

(56) References Cited

U.S. PATENT DOCUMENTS 7,221,939 B2    5/2007   Ylitalo et al.
8,201,224 B1    6/2012   Spertus
(Continued)

FOREIGN PATENT DOCUMENTS

CA    2798972 A1    6/2013
EP    2608099 A1    6/2013

OTHER PUBLICATIONS

Extended European Search Report. European Patent Application No. 11195556.3. Dated May 8, 2012.
(Continued)

*Primary Examiner* — Vincent Tran
(74) *Attorney, Agent, or Firm* — Integral Intellectual Property Inc.; Miriam Paton; Amy Scouten

(57) ABSTRACT

Methods and devices for controlling system settings of a computing device are described herein. One example embodiment comprises: determining configuration data associated with a software application, wherein the configuration data identifies one or more new system settings to be temporarily enforced on the computing device during an execution of the software application, and wherein the configuration data is digitally signed; and in response to an initiation of the execution of the software application, reconfiguring system settings on the computing device; wherein the reconfiguring comprises verifying at least one digital signature associated with the digitally signed configuration data; wherein if the at least one digital signature associated with the digitally signed configuration data successfully verifies, then the reconfiguring further comprises temporarily enforcing new system settings for the duration of the execution of the software application.

21 Claims, 13 Drawing Sheets

(51) Int. Cl.
*G06F 21/53* (2013.01)
*G06F 21/54* (2013.01)
*G06F 21/60* (2013.01)

(56) References Cited

U.S. PATENT DOCUMENTS

| | | | |
|---|---|---|---|
| 8,656,490 B1* | 2/2014 | Sobel | 726/22 |
| 8,799,634 B2* | 8/2014 | Courtney et al. | 713/100 |
| 2003/0097551 A1 | 5/2003 | Fuller et al. | |
| 2003/0126432 A1* | 7/2003 | Tonisson | 713/156 |
| 2003/0159035 A1 | 8/2003 | Orthlieb et al. | |
| 2003/0177389 A1 | 9/2003 | Albert et al. | |
| 2005/0229005 A1* | 10/2005 | Le Saint et al. | 713/185 |
| 2005/0257251 A1 | 11/2005 | McKune et al. | |
| 2006/0041760 A1* | 2/2006 | Huang | 713/189 |
| 2006/0090195 A1 | 4/2006 | Pearson et al. | |
| 2008/0281168 A1* | 11/2008 | Gibson et al. | 600/301 |
| 2009/0187780 A1* | 7/2009 | Keohane et al. | 713/324 |
| 2009/0259855 A1 | 10/2009 | de Cesare et al. | |
| 2010/0056124 A1 | 3/2010 | Keating et al. | |
| 2010/0180221 A1 | 7/2010 | Cloward et al. | |
| 2012/0011561 A1* | 1/2012 | Courtney | G06F 21/604 726/1 |
| 2012/0096516 A1* | 4/2012 | Sobel et al. | 726/2 |
| 2013/0166899 A1 | 6/2013 | Courtney et al. | |

OTHER PUBLICATIONS

Response to Extended European Search Report. European Patent Application No. 11195556.3. Dated Dec. 14, 2012.
Exam Report. European Patent Application No. 11195556.3. Dated Nov. 20, 2013.
Response to Exam Report. European Patent Application No. 11195556.3. Dated Feb. 20, 2014.
Prosecution Documents for U.S. Appl. No. 13/336,038, allowed on Apr. 1, 2014.
Office Action for Canadian Patent Application 2,798,972, dated Nov. 27, 2014.

* cited by examiner

METHOD AND SYSTEM FOR CONTROLLING SYSTEM SETTINGS OF A COMPUTING DEVICE

CROSS-REFERENCE TO RELATED APPLICATION

This application is a continuation of U.S. patent application Ser. No. 13/336,038, filed Dec. 23, 2011. The entire contents of U.S. application Ser. No. 13/336,038 are hereby incorporated by reference

FIELD

Embodiments of the method and system described herein relate generally to the control of settings on computing devices, and more specifically, to a method and system for controlling system settings to secure an operating environment when a software application executes on a computing device.

BACKGROUND

In typical computer systems, a software application's operating environment is defined by the operating system, which enforces access restrictions to system resources by applications. These access restrictions may be implemented by appropriately defining certain system settings to be applied by the operating system.

BRIEF DESCRIPTION OF THE DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

Figure 1:
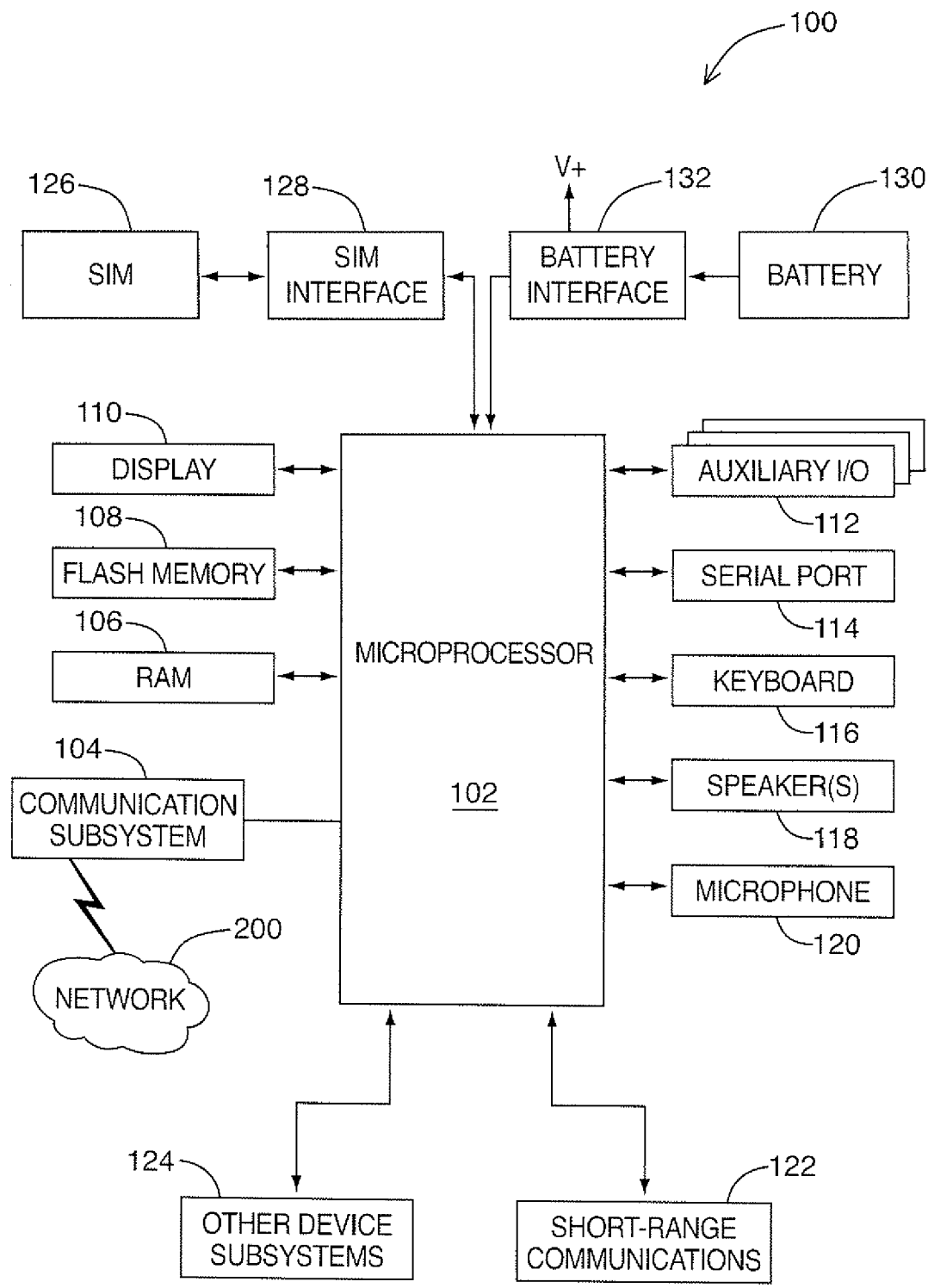
FIG. 1 is a block diagram of a mobile device in one example implementation.

Many of the system settings that the operating system will consider when enforcing access restrictions may be specified in a security policy (e.g. an IT policy) governing operation of the computing device, created and applied by an administrator, for example. In this arrangement, making any changes to these settings may require the creation and application of a new policy. If changes are frequent, this process can be quite burdensome and inefficient. System settings may include, for example, any configurable setting of the operating system that may be modified to affect security, during the operation of the computing device.

There may be situations in which an application developer would find it desirable to temporarily change system settings and secure the operating environment during the execution of his particular software application on a computing device (e.g. a mobile device). Securing the operating environment may involve controlling access to certain computing resources on the computing device.

For example, in order to prevent the theft of client information, the developer of a financial services application may wish to secure the operating environment of the computing device for the duration of the execution of the software application. In particular, the application developer may seek to control certain system settings. The application developer may seek to disable, for instance, Bluetooth, Wi-Fi, text-to-speech, and a user's ability to take a screenshot or use the clipboard to copy and paste information from the screen, while the financial services application is being executed. Other system settings, depending on the level of security that is desired by the application developer, may need to be elevated to a minimum prescribed threshold (e.g., encryption strength set to "HIGH" setting).

The claimed embodiments are generally directed to a system and method that allows a software application to temporarily control a particular computing device's system settings and define a level of security associated with its own operating environment during execution of the software application on that particular computing device, without requiring an administrator to update the security policy governing the operation of the computing device.

Furthermore, security policies governing the operation of a computing device may define system settings to be applied on the computing device regardless of the specific software applications being executed at a given point in time. In contrast, at least some of the embodiments described herein allow the system settings to be temporarily changed on an application-specific basis.

When developing a software application that is intended to be executed in an operating environment that affords a certain level of security, the application developer may define the desired system settings to be temporarily applied on the computing device during execution of the software application using "configuration data", which is to be associated with that particular software application (and in some embodiments, not associated with any other application). The configuration data may be provided in the form of one or more security policy files or permissions lists generated specifically for that particular software application, for example. The configuration data defines the restrictions on access to specified system resources, to be enforced while that particular software application is being executed.

At least some of the claimed embodiments also facilitate the approval of configuration data associated with a software application, by an application authority, for example. This allows the application authority to manage which software applications will be permitted to control access to various system resources on the computing device.

It will be understood that a software application may comprise applets, scripts and/or other code that is otherwise executable on the computing device. For brevity, a software application, or an instance of a software application, is referred to generally herein as an "application".

In one broad aspect, there is provided a method of controlling system settings to secure an operating environment of a computing device. The method may comprise: determining configuration data associated with a software application, wherein the configuration data identifies one or more new system settings to be temporarily enforced on the computing device during an execution of the software application, and wherein the configuration data is digitally signed; and in response to an initiation of the execution of the software application, reconfiguring system settings on the computing device.

The reconfiguring may comprise verifying at least one digital signature associated with the digitally signed configuration data; wherein if the at least one digital signature associated with the digitally signed configuration data successfully verifies, then the reconfiguring further comprises temporarily enforcing new system settings for the duration of the execution of the software application.

The temporarily enforcing new system settings may comprise, for each of at least one new system setting identified by the configuration data: storing data identifying a corresponding original system setting, and applying the new system setting. The temporarily enforcing new system settings may then further comprise continuing the execution of the software application with the new system settings applied, until the execution of the software application terminates; detecting termination of the software application; and restoring original system settings upon the termination of the software application.

In some embodiments, the reconfiguring further comprises verifying that a certificate used to verify the digital signature associated with the digitally signed configuration data is valid, and wherein the temporarily enforcing new system settings is performed after successfully verifying that the certificate is valid.

In some embodiments, the reconfiguring further comprises verifying a digital signature associated with the digitally signed software application, wherein the temporarily enforcing new system settings is performed after successfully verifying the digital signature associated with the digitally signed software application. The reconfiguring may further comprise verifying that a certificate used to verify the digital signature associated with the digitally signed software application is valid, and wherein the temporarily enforcing new system settings is performed after successfully verifying that the certificate is valid.

In some embodiments, the at least one digital signature associated with the digitally signed configuration data comprises a first digital signature generated at a developer device and a second digital signature generated at an application authority. The configuration data may be digitally signed at the developer device to produce developer-signed configuration data, and the developer-signed configuration data may be digitally signed at the application authority to produce the digitally signed configuration data.

In some embodiments, an identifier that uniquely identifies the software application is provided with the configuration data. The identifier may be a hash of the software application.

In some embodiments, the configuration data that is digitally signed is accompanied by developer-identifying data associated with the application. The developer-identifying data may comprise a signed hash of a developer's certificate.

In some embodiments, the method further comprises detecting the initiation of the execution of the software application.

In some embodiments, the method further comprises receiving the configuration data at the computing device. This may involve receiving the software application with the configuration data at the computing device.

In some embodiments, if the corresponding original system setting is higher than the new system setting, the applying the new system setting comprises not changing in the original system setting.

In some embodiments, the applying the new system setting may comprise: determining if the new system setting is more restrictive than the corresponding original system setting, and changing the original system setting to the new system setting if the new system setting is more restrictive. In these embodiments, the continuing the execution of the software application with the new system settings applied may comprise continuing the execution of the software application with combined system settings that include at least one new system setting and at least one original system setting.

In some embodiments, if the at least one digital signature associated with the digitally signed configuration data fails to successfully verify, then the method further comprises generating an error message and then performing at least one of: transmitting the error message to a developer device, transmitting the error message to an application authority device, and displaying the error message on a user interface of the computing device.

In some embodiments, the computing device comprises a mobile device.

In another broad aspect, there is provided a computing device comprising a processor and a memory, wherein the processor is configured to: determine configuration data associated with a software application, wherein the configuration data identifies one or more new system settings to be temporarily enforced on the computing device during an execution of the software application, and wherein the configuration data is digitally signed; and in response to an initiation of the execution of the software application, reconfigure the system settings on the computing device.

To reconfigure the system settings, the processor may be further configured to verify at least one digital signature associated with the digitally signed configuration data; wherein if the at least one digital signature associated with the digitally signed configuration data successfully verifies, then to reconfigure the system settings on the computing device, the processor may be further configured to temporarily enforce new system settings for the duration of the execution of the software application.

To temporarily enforce new system settings, the processor may be further configured to, for each of at least one new system setting identified by the configuration data: store data identifying a corresponding original system setting, and apply the new system setting. The processor may then be further configured to continue the execution of the software application with the new system settings applied, until the execution of the software application terminates; detect termination of the software application; and restore original system settings upon the termination of the software application.

In some embodiments, the computing device may comprise a mobile device.

In another broad aspect, there is provided a non-transitory computer-readable storage medium comprising instructions, which when executed by a processor of a computing device, cause the processor to perform acts of a method of controlling system settings to secure an operating environment of a computing device, wherein the method may comprise: determining configuration data associated with a software application, wherein the configuration data identifies one or more new system settings to be temporarily enforced on the computing device during an execution of the software application, and wherein the configuration data is digitally signed; and in response to an initiation of the execution of the software application, reconfiguring system settings on the computing device.

The reconfiguring may comprise verifying at least one digital signature associated with the digitally signed configuration data; wherein if the at least one digital signature associated with the digitally signed configuration data successfully verifies, then the reconfiguring further comprises temporarily enforcing new system settings for the duration of the execution of the software application.

The temporarily enforcing new system settings may comprise, for each of at least one new system setting identified by the configuration data: storing data identifying a corresponding original system setting, and applying the new system setting. The temporarily enforcing new system settings may then further comprise continuing the execution of the software application with the new system settings applied, until the execution of the software application terminates; detecting termination of the software application; and restoring original system settings upon the termination of the software application.

In some embodiments, the computing device may comprise a mobile device.

In another broad aspect, there is provided a method of controlling system settings to secure an operating environment of a computing device. The method may comprise: determining configuration data associated with a software application, wherein the configuration data identifies one or more new system settings to be temporarily enforced on the computing device during an execution of the software application; in response to an initiation of the execution of the software application, determining if the software application is allowed to enforce the one or more new system settings; and if the software application is allowed to enforce the one or more system settings, configuring system settings on the computing device to temporarily enforce the new system settings for the duration of the execution of the software application.

The temporarily enforcing new system settings may comprise, for each of at least one new system setting identified by the configuration data: storing data identifying a corresponding original system setting, and applying the new system setting. The temporarily enforcing new system settings may then further comprise continuing the execution of the software application with the new system settings applied, until the execution of the software application terminates; detecting termination of the software application; and restoring original system settings upon the termination of the software application.

In some embodiments, the computing device may include a policy indicating whether the software application can enforce the one or more new system settings, and the determining if the software application is allowed to enforce the one or more new system settings is based on the policy.

Figure 2:
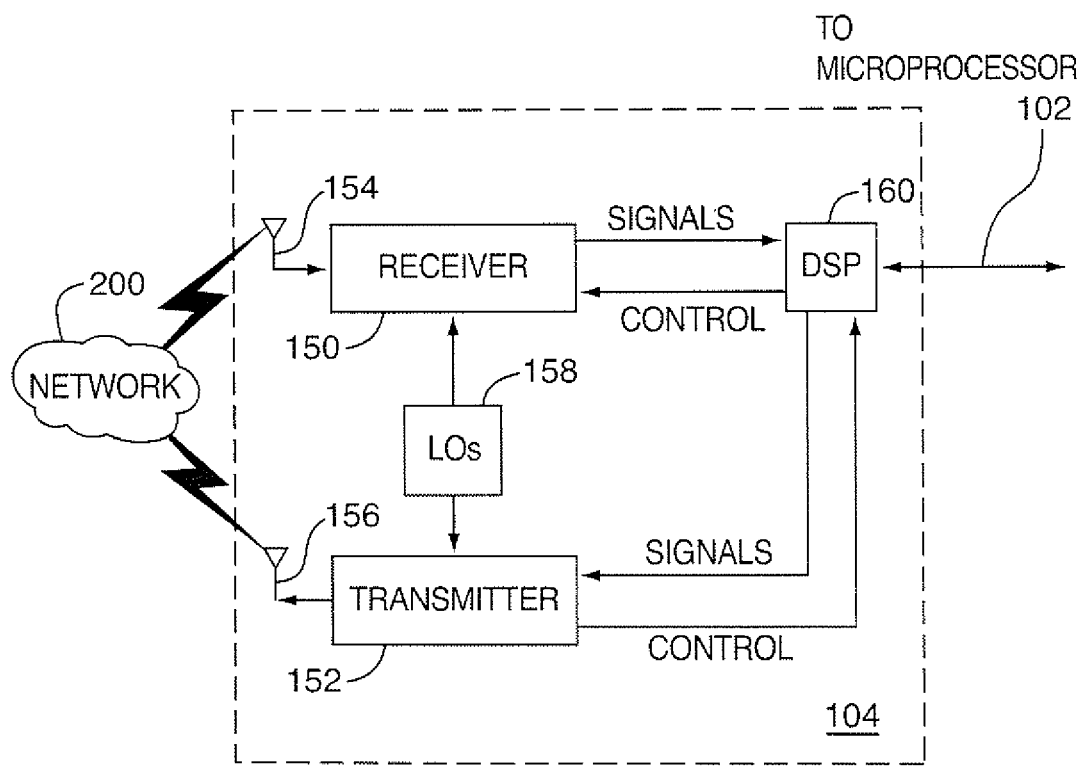
FIG. 2 is a block diagram of a communication sub-system component of the mobile device of FIG. 1.
Figure 3:
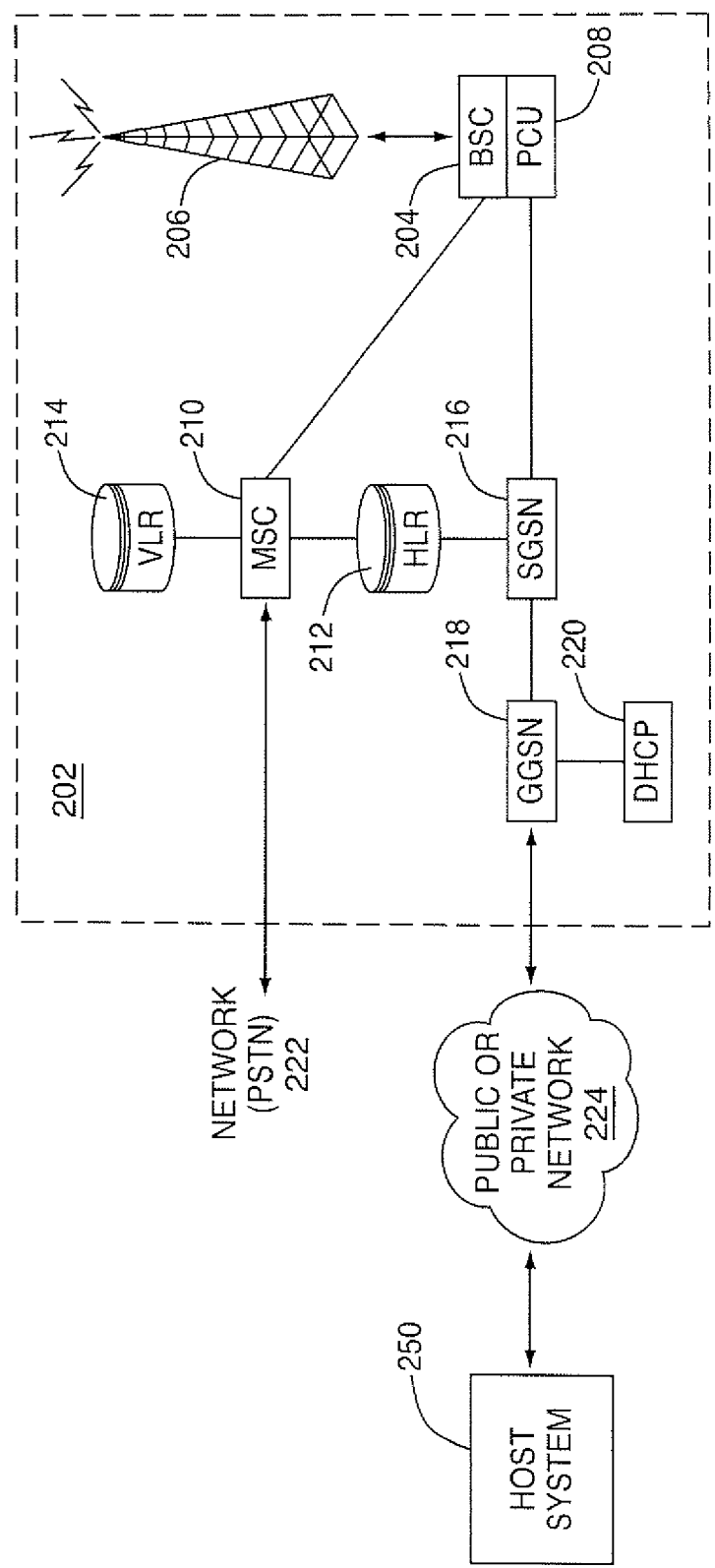
FIG. 3 is a block diagram of a node of a wireless network in one example implementation.

Reference is first made to FIGS. 1 to 3 for a general description of an example structure of a mobile device and how the mobile device operates and communicates with other devices. The mobile device (sometimes referred to alternatively as a "mobile station" or "portable electronic device") may comprise a two-way communication device with advanced data communication capabilities having the capability to communicate with other computer systems and devices. The mobile device may include the capability for voice communications, data communications or a combination of the two. Depending on the functionality provided by the mobile device, it may be referred to as a smartphone, a data messaging device, a two-way pager, a cellular telephone with data messaging capabilities, a wireless Internet appliance, a laptop computer, a tablet computer, a media player (such as an MP3 player), an electronic book reader or a data communication device (with or without telephony capabilities). Although a mobile device is described herein by way of illustration, embodiments described herein may be applicable to other computing devices other than mobile devices. For example, embodiments described herein may be applied to other computing devices and platforms that guard resources with permission access requests in variant implementations.

Referring now to FIG. 1 specifically, a block diagram of a mobile device 100 in one example implementation is shown generally. Mobile device 100 comprises a number of components, the controlling component being microprocessor 102. Microprocessor 102 controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 may be configured for cellular communication in accordance with the Global System for Mobile Communication (GSM) and General Packet Radio Services (GPRS) standards. The GSM/GPRS wireless network is used worldwide and it is expected that other standards such as Enhanced Data GSM Environment (EDGE) and Universal Mobile Telecommunications Service (UMTS) may be employed. These standards are mentioned as examples only, and other standards may be employed on computing devices to which embodiments described herein are applied.

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

The wireless network associated with mobile device 100 may comprise a GSM/GPRS wireless network in one example implementation of mobile device 100; however, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and n-generation (e.g. 2.5G, 3G, 3.5G, 4G, etc.) networks like EDGE, UMTS, High-Speed Downlink Packet Access (HSDPA), High-Speed Uplink Packet Access (HSUPA), High-Speed Packet Access (HSPA), and Long Term Evolution (LTE), etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, one or more speakers 118, microphone 120, short-range communication subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications (illustrated as applications 402 in FIG. 4, below), or parts thereof, may be temporarily loaded into a volatile store such as RAM 106.

In some embodiments, mobile device 100 may send and receive communication signals over network 200 after required network registration or activation procedures have been completed. Network access is associated with a subscriber or user of a mobile device 100. To identify a subscriber, mobile device 100 may require a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 may have limited ability for communication with network 200.

By inserting SIM 126 into SIM interface 128, a subscriber can access all subscribed services. Services could include: web browsing and messaging such as e-mail, voice mail, Short Message Service (SMS), media transfers (such as music downloading or streaming), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that subscribers are not necessarily bound by any single physical mobile device. SIM 126 may store additional subscriber information for a mobile device as well, including datebook (or calendar) information and recent call information. In certain embodiments SIM 126 may be a different type of user identifier and may be integral to mobile device 100 or not present at all. By way of further examples, a Universal Integrated Circuit Card (UICC), eUICC (Embedded UICC), Removable User Identify Module (R-UIM), CDMA Subscriber Identity Module (CSIM), or Universal Subscriber Identity Module (USIM) may be employed.

Mobile device 100 includes a power pack that supplies power to electronic components and that supports portability. The power pack may be of any type, but for clarity it will be assumed that mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed in flash memory 108 (or other non-volatile storage) on mobile device 100 during its manufacture.

Additional applications may also be loaded onto mobile device 100 through network 200, auxiliary I/O subsystem 112, serial port 114, short-range communications subsystem 122, or the other device subsystems 124. This flexibility in application installation increases the functionality of mobile device 100 and may provide enhanced on-device functions, communication-related functions, or both. For example, secure communication applications may enable electronic commerce functions and other such financial transactions to be performed using mobile device 100. Numerous other types of applications may be loaded onto mobile device 100 or other computing devices, including without limitation, messaging applications (e.g. e-mail, text, instant, video, etc.), voice communication applications, calendar applications, address book applications, utility applications, browser application, media player (e.g. audio, video, etc.) applications, social network applications, camera applications, gaming applications, productivity applications, etc.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

It should be noted that the term "download" and forms thereof as used herein, are used generally to describe a transfer of data from one system to another, and is not intended to be limiting with regards to the origin or destination of the transfer, for example. Accordingly, where the term "download" and forms thereof are used in the specification and in the claims, it is intended to encompass other forms of transfers including, for example, an "upload" or a "sideload" of data (e.g. a Universal Serial Bus (USB) sideload).

Short-range communications subsystem 122 provides for wireless device connections to enable communication between mobile device 100 and different systems or devices, without the use of network 200. For example, subsystem 122 may include an infrared device and associated circuits and components for short-range communication. Examples of short range communication would include standards developed by the Infrared Data Association (IrDA), Near Field Communication (NFC), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, infrared fingerprint detector, or a roller wheel with a dynamic button pressing capability. Further, auxiliary I/O subsystem 112 may comprise a two-dimensional navigation (or scrolling) component, such as a track ball, a joystick or a directional pad, each optionally with a dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to the one or more speakers 118, and signals for transmission would be generated by microphone 120. Alternative voice or audio I/O subsystems, such as a voice message recording subsystem, may also be implemented on mobile device 100. Although voice or other audio signal output is accomplished primarily through the one or more speakers 118, display 110 may also be used to provide additional information such as the identity of a calling party, duration of a voice call, or other voice call related information. Microphone 120 can receive a supply of power, in the form of a bias voltage and bias current, from the rechargeable battery 130. Different types and configurations of microphone 120 can be incorporated into the mobile device 100.

Referring now to FIG. 2 specifically, a block diagram of the communication subsystem 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3 specifically, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server.

Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

The public or private network 224 may also provide access to a host system 250.

Figure 4:
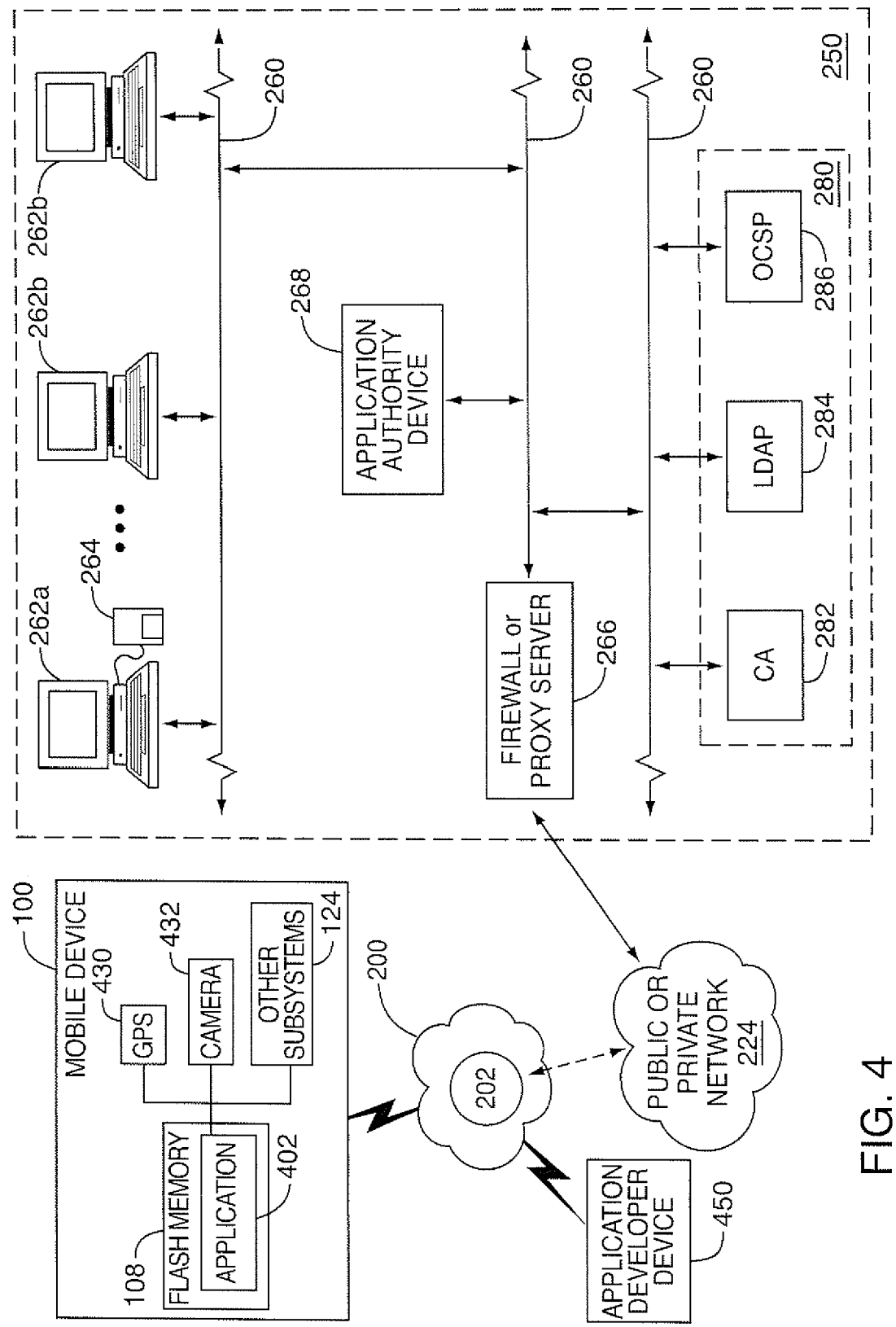
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a USB connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

At least some embodiments described herein relate generally to methods of controlling system settings to secure an operating environment of a mobile device 100 in which an application (e.g. 402) executes. Accordingly, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Secure communication protocols rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message or other form of data using a digital signature. A digital signature is a digest of the message (e.g. a hash of the message) encrypted using the sender's private key, which can then be appended to the outgoing message. To verify the signature of the message when received, the recipient uses the same technique as the sender (e.g. using the same standard hash algorithm) to obtain a digest of the received message. The recipient also uses the sender's public key to decrypt the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

Figure 5:
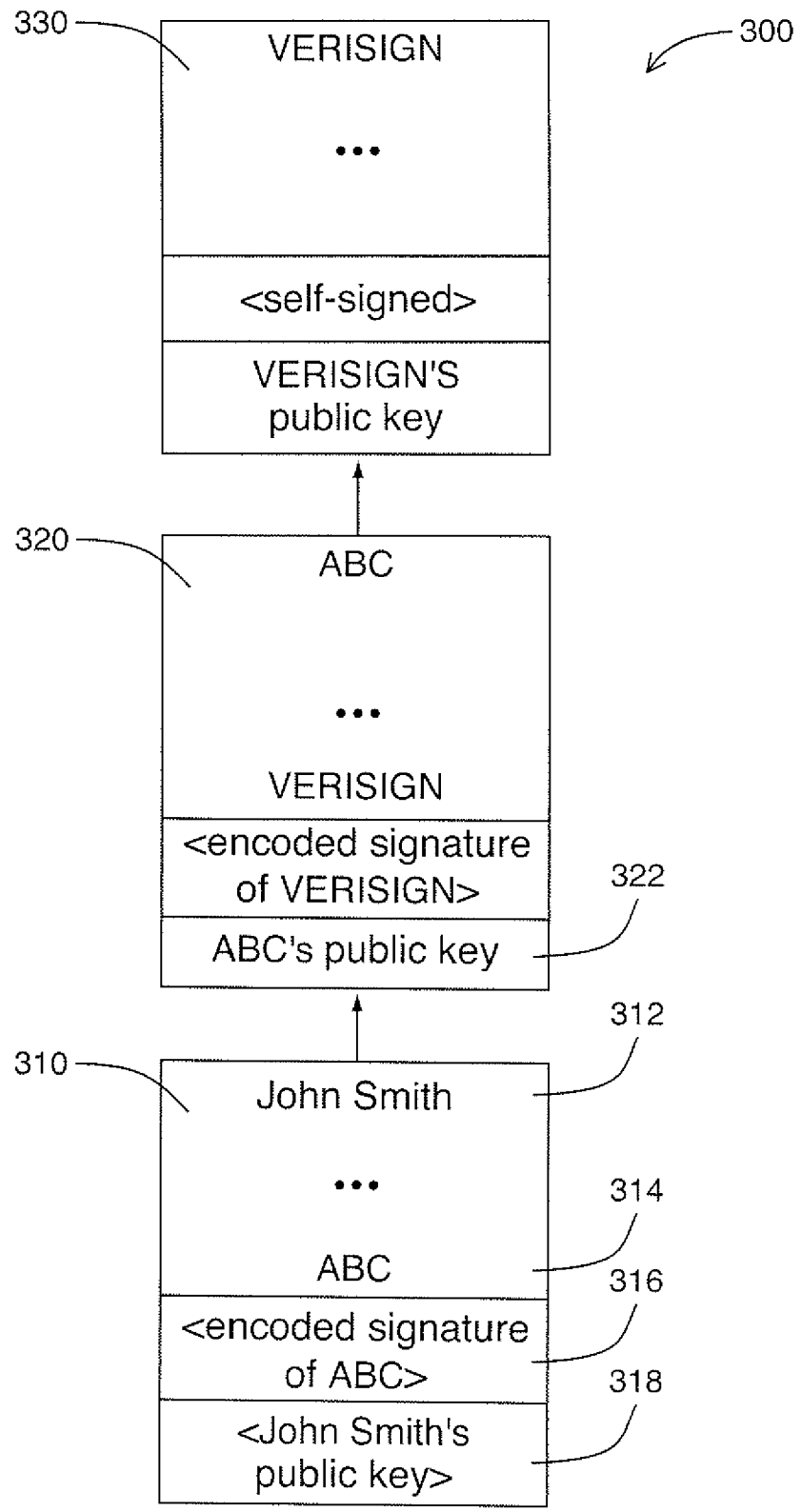
FIG. 5 is a block diagram showing an example of a certificate chain.

Consider FIG. 5, in which an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314 (ABC in this example), and includes a digital signature of the issuer 316 and the certificate holder's public key 318. Certificate 310 may also include other information and attributes that identify the certificate holder (e.g. e-mail address, organization name, organizational unit name, location, etc.). When the individual composes a message to be sent to a recipient, it is customary to include that individual's certificate 310 with the message.

The certificate holder identified in a certificate is also referred to as the "subject" of that certificate. From the perspective of a given certificate holder, a certificate issued to him or her, and which typically contains his or her public key, may be referred to as a "personal certificate". Accordingly, in the example of FIG. 5, certificate 310 may be regarded as John Smith's personal certificate, as John Smith is the subject of certificate 310.

For a public key to be trusted, its issuing organization must be trusted. The relationship between a trusted CA and a user's public key can be represented by a series of related certificates, also referred to as a certificate chain. The certificate chain can be followed to determine the validity of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. This requires verifying that the digital signature 316 of issuer ABC appended to certificate 310 is valid.

As will be understood by those skilled in the art, determining whether a certificate is valid may include more than just determining the trust status of the certificate. For example, determining the validity of the certificate may also include determining other properties of the certificate, such as whether the certificate is expired, or whether the certificate has been revoked.

Certificate 320 may already be stored in a certificate store on the recipient's computing device, or it may need to be retrieved from a certificate source (e.g. Lightweight Directory Access Protocol (LDAP) server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required, when verifying the trust status of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a particular certificate cannot be chained to a trusted certificate, that certificate may be considered to be "not trusted".

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

Certificates stored on computer 262a and downloaded to mobile device 100 are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key may be exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

While certain techniques for securing message data have been discussed above, it will be understood that other types of data may also be secured for transmission using analogous techniques. For example, as described below, configuration data that is associated with an application 402, the application 402 itself, or both may be digitally signed.

Applications 402 executable on a mobile device 100 may be stored on an application authority device 268 (also referred to generally herein as an "application authority"). Application authority 268 may have access to an application database [not shown] that stores applications 402 for download and execution on the mobile device 100.

As described in greater detail below, the application authority 268 may receive, from an application developer device 450 (also referred to generally herein as "developer device"), configuration data defining the desired system settings (also referred to herein as "device system settings") for the secure environment in which the application 402 is to be executed. The application authority 268 may be configured to authorize or approve the configuration data for an application 402 before the configuration data is used to modify the operating environment of a mobile device 100. The configuration data may be submitted by the developer device 450 for authorization. The developer device 450 may be any device (e.g., a desktop computer) used by an application developer to author applications 402 or to manage applications 402.

By way of illustration, the application authority 268 may comprise an internal network server of the host system 250 used to store applications 402 to be deployed to the organization's mobile devices 100. In a variant embodiment, the application authority 268 may additionally or alternatively provide an application store or application market that is accessible from the mobile device 100. The application store may allow users of mobile devices 100 to search for, purchase, and download applications 402 to their mobile devices 100.

In variant embodiments, the application authority 268 may reside outside of the host system 250, on a remote system accessible via the public or private network 224, for example. For example, the application authority 268 may be a platform vendor that is separate from the internal organization that the user of the mobile device 100 belongs to.

For ease of understanding the described embodiments related to application operation, FIG. 4 further illustrates a simplified view of a subset of components of the mobile device 100 described above. The mobile device 100 may run applications 402 that access computing resources on the mobile device 100. Applications 402 may be stored in the flash memory 108 (FIG. 1) of the mobile device 100 or some other persistent store pending execution, with instructions being loaded into RAM 106 (FIG. 1) during execution. Applications 402 may access computing resources available on the mobile device 100 when executed. Access may be in the form of the applications invoking application programming interfaces (APIs) made available by the operating system to access the computing resources, for example.

More particularly, computing resources may be associated with a hardware component (e.g., sensors, radios, or peripherals described above) or a software module (e.g., ones that provide access to data or communication buses described above), and may be made accessible to the application 402 via an API provided by the operating system of the mobile device 100. For example, the mobile device 100 may allow applications to access a GPS subsystem 430 that is capable of determining the physical location of the mobile device 100, or a camera subsystem 432 that is capable of capturing photographs or video. Other accessible resources may include access to software functionality (e.g., encryption services) or data (e.g., phone book entries) available on the mobile device 100, for example.

The configuration data for an application 402 may indicate the computing resources to which access is to be restricted (either not allowing access, or enforcing a heightened security level) when the application 402 is being executed on a mobile device 100. For example, as noted earlier, for a financial services application 402 that may process or display sensitive or confidential financial information in a user interface of mobile device 100 during execution of the software application, the configuration data for such application may indicate that any screen capture operations provided by the operating system are to be restricted from being accessed during the execution.

The configuration data for an application 402 may comprise attributes which describe in detail what system settings would be modified when the associated application 402 is executed. The attributes exist and may be appropriately set to allow the application 402 to secure the operating environment. These attributes may be defined in a security policy file ("Secure Application Policy"). Some examples of these attributes may include, without limitation:

Bluetooth disabled (Yes/No)
Wi-Fi disabled (Yes/No)
screenshot disabled (Yes/No)
session timeout of the application or browser session in minutes if idle (1, 2, 3, 4, 5, 10, 15, 30, 60)
text-to-speech disabled (Yes/No)

ability to use the clipboard to copy/paste from within the application (Yes/No)

settings related to cryptographic protocols, such as
  permit insecure renegotiation (Yes/No)—e.g., whether or not to permit connections to servers not supporting Transport Layer Security (TLS) Renegotiation Indication Extension under RFC 5746
  encryption strength (High, Medium, Low)—e.g., the strength of cipher used to encrypt messages in secure communications; in some cases, this attribute may be performed as a part of the TLS cipher suite selection
  hash digest strength (Allow weak hashes, Prompt the user when weak hashes are used, or Only allow strong hashes)—e.g., allows the control of the strength of the hash digest to be used in secure communications
  Proxy TLS (Yes/No)—e.g., whether to allow the mobile device to connect to an end server through a proxy server
allow other non-native ("third-party") applications to run when the application is active (Yes/No)
allow multitasking (e.g. switching to another running application) (Yes/No)

Allowing an application that executes on a mobile device 100 to control system settings that may override, even temporarily, settings that an administrator expects to be enforced may present certain security risks. These risks might be particularly heightened if the administrator is not aware that a particular application has been installed on the mobile device 100, or that the particular application will attempt to change system settings during execution.

To reduce the likelihood that an application 402 might, for example, damage the mobile device 100 when given the ability to control its own operating environment, in at least one embodiment described herein, a mobile device 100 is configured to perform one or more verifications before permitting enforcement of the restrictions defined by the configuration data associated with the application 402 on the mobile device 100.

For example, the mobile device 100 may be configured to verify that the configuration data originated from the developer of the application 402, or that the configuration data has been authorized by an application authority 268, or both. In at least one example embodiment, this verification involves verifying one or more digital signatures, such as a digital signature of the application developer 450, a digital signature of the application authority 268, or both.

Accordingly, in at least some embodiments, select applications which are approved and digitally accredited by the application authority may be given the ability to temporarily and automatically configure and modify system settings to secure the operating environment. In some implementations where an application launches a session with a browser when the application is executed, the system settings may comprise browser settings that may be temporarily configured and modified.

The following example embodiments are described with reference to a mobile device 100 for ease of exposition. However, it will be understood that certain acts described herein may be performed in respect of some other computing device in variant embodiments.

Figure 6A:
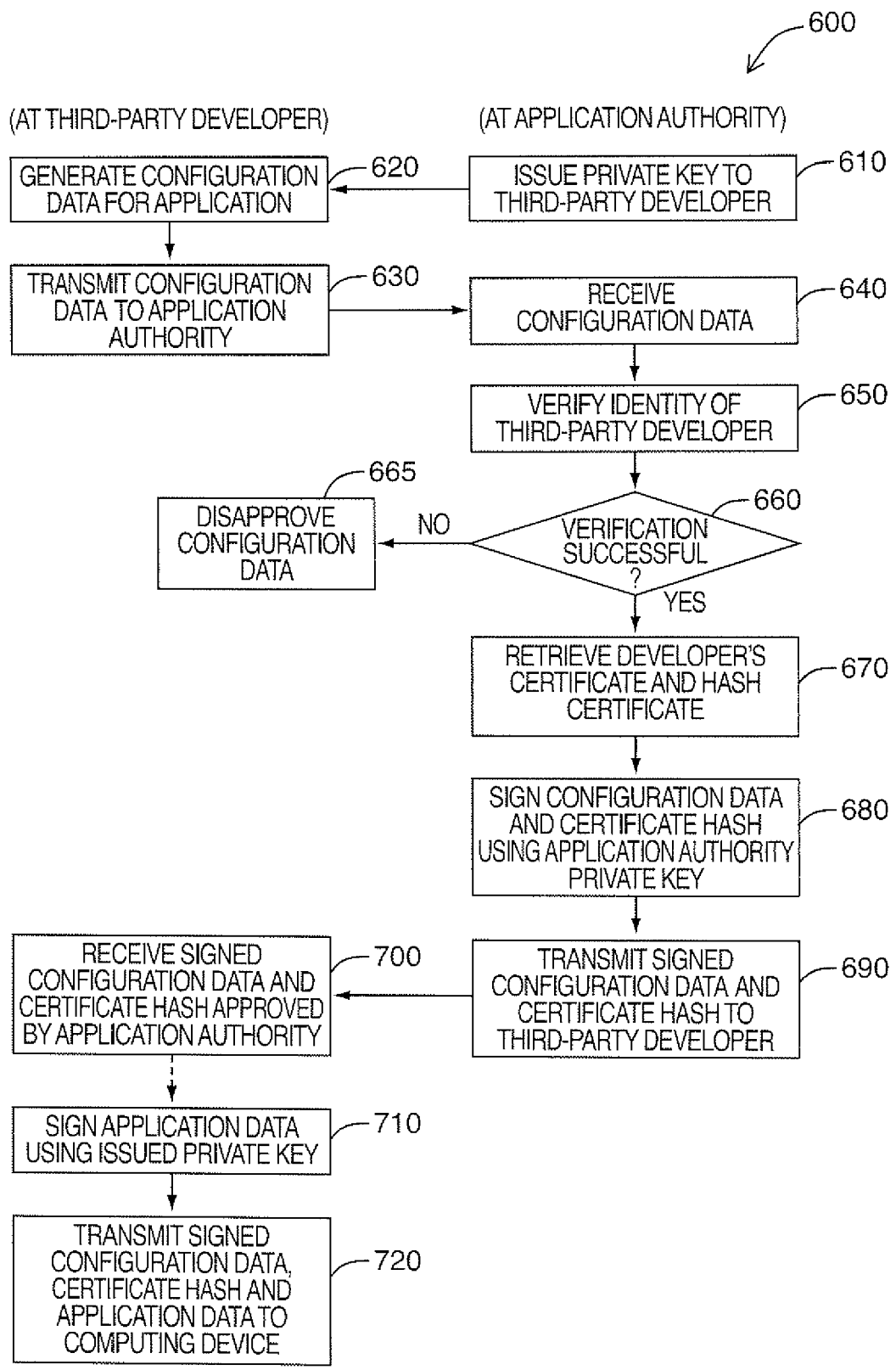
FIG. 6A is a flowchart diagram illustrating a process for providing configuration data for a software application executable at a computing device in accordance with at least one embodiment.

Referring to FIG. 6A, illustrated there generally as 600, is a flowchart diagram of a process for providing configuration data for an application executable at a computing device (e.g. a mobile device 100), in which configuration data and a certificate hash is signed at the application authority, in accordance with at least one embodiment.

At 610, the application authority 268 issues a private key to an application developer (also referred to herein as a "third-party developer"). The private key may be transmitted to the developer device 450 (FIG. 4). This may be performed, for example, using any of various appropriate methods of transmitting private keys to third-party developers.

At 620, the application developer generates configuration data to be associated with an application 402 (FIG. 4). This may be in the form of a security policy, for example, that defines certain attributes that describe which system settings would be modified when the application 402 is executed on the mobile device 100. Accordingly, the configuration data identifies one or more new system settings to be temporarily enforced on the computing device during an execution of the software application 402 on the mobile device 100 (and in some embodiments, only during the execution of application 402, and not during the execution of other applications on the mobile device 100). In some embodiments, the configuration data may be provided in a format similar to that of an IT Policy. However, it will be understood that other formats may also be possible, such as listing the system setting names and how they are to be configured in name/value pairs.

At 630, the developer device 450 transmits the configuration data to the application authority 268 (FIG. 4) for approval. The application authority 268 receives the configuration data from the developer device at 640.

At 650, the application authority 268 verifies the identity of the application developer. For example, this may be performed by verifying a signature generated at the developer device using the private key issued to the developer at 610. If the verification is successful (the 'YES' branch at 660), the application authority 268 proceeds to approve the configuration data submitted by the developer device, and the flow of method steps proceeds to 670. However, if the verification at 660 is not successful, then at 665, the application authority 268 disapproves the configuration data received from the developer device 450. In this case, an error message may be transmitted to the developer device 450 indicating that the configuration data was not approved.

At 670, the application authority 268 retrieves a digital certificate for the application developer or developer device 450. In some embodiments, the digital certificate may be retrieved from the developer device 450 (e.g., the digital certificate may also be transmitted when the configuration data is transmitted at 630). Optionally, the validity (or specifically the trust status, expiration status, revocation status, or some combination thereof) of the developer's digital certificate may be verified. The digital certificate may serve to identify the application developer of the application who provided the configuration data for approval. In one example embodiment, a hash of the digital certificate is generated at 670.

At 680, the application authority 268 appends the hash of the digital certificate for the application developer generated at 670 to the configuration data received at 640 (which is in plaintext), and digitally signs the resultant binary data using the application authority's own private key. By digitally signing the combined hash and the configuration data, the application authority 268 is able to associate the application developer (represented by the hash of the application developer's digital certificate) with the configuration data. Signing the hash and the configuration data also signifies that the configuration data has been authorized for use on the mobile device 100 by the application authority 268, in respect of applications provided by the application developer.

At 690, the application authority 269 transmits the digitally signed configuration data and certificate hash to the application developer. This data is received by the application developer at 700.

After the application developer has authored application data for an application 402 to be transmitted to the mobile device 100, at 710, the application developer digitally signs the application data using the private key that was issued to the application developer by the application authority 268 at 610. The digital signature that is generated as a result of the signing is then appended to the application data. The application data may then be provided with configuration data to the mobile device 100.

The application data to be provided with the configuration data for an application 402 may comprise the actual application itself to be executed on the mobile device 100, or it may be a hash of the application or some other identifier that uniquely identifies the application 402, which has or will otherwise be made available for execution on the mobile device 100.

At 720, the configuration data for the application 402 that is digitally signed is then transmitted to the mobile device 100. The digitally signed application data is also transmitted with the configuration data. The configuration data that is digitally signed is also accompanied by developer-identifying data associated with the application 402, namely the signed hash of the application developer's certificate (the configuration data and the hash having been collectively signed by the application authority at 690).

In the embodiments described with reference to FIG. 6A, application data and configuration data have been transmitted to the mobile device without the application authority having reviewed the application or associated application data. Only the configuration data that defines how the system settings are to be modified has been approved by the application authority; however, the approved configuration data may potentially be associated and re-used with any application originating from the application developer. The application may have been authored before, or even after the configuration data was approved by the application authority. This arrangement may be desirable in situations where there is a trusted relationship between the application authority and the application developer. For example, the application authority may be willing to pre-authorize the application developer to control certain device system settings once (e.g. effective for a certain period of time), to be applied to any of multiple applications authored by the application developer. Then, it is not necessary for the application developer to submit configuration data for approval with each application it develops. However, this may increase security risks from the perspective of the application authority or an administrator. These embodiments may also be employed in addition to any existing methods of application control (e.g., code-signing).

Figure 6B:
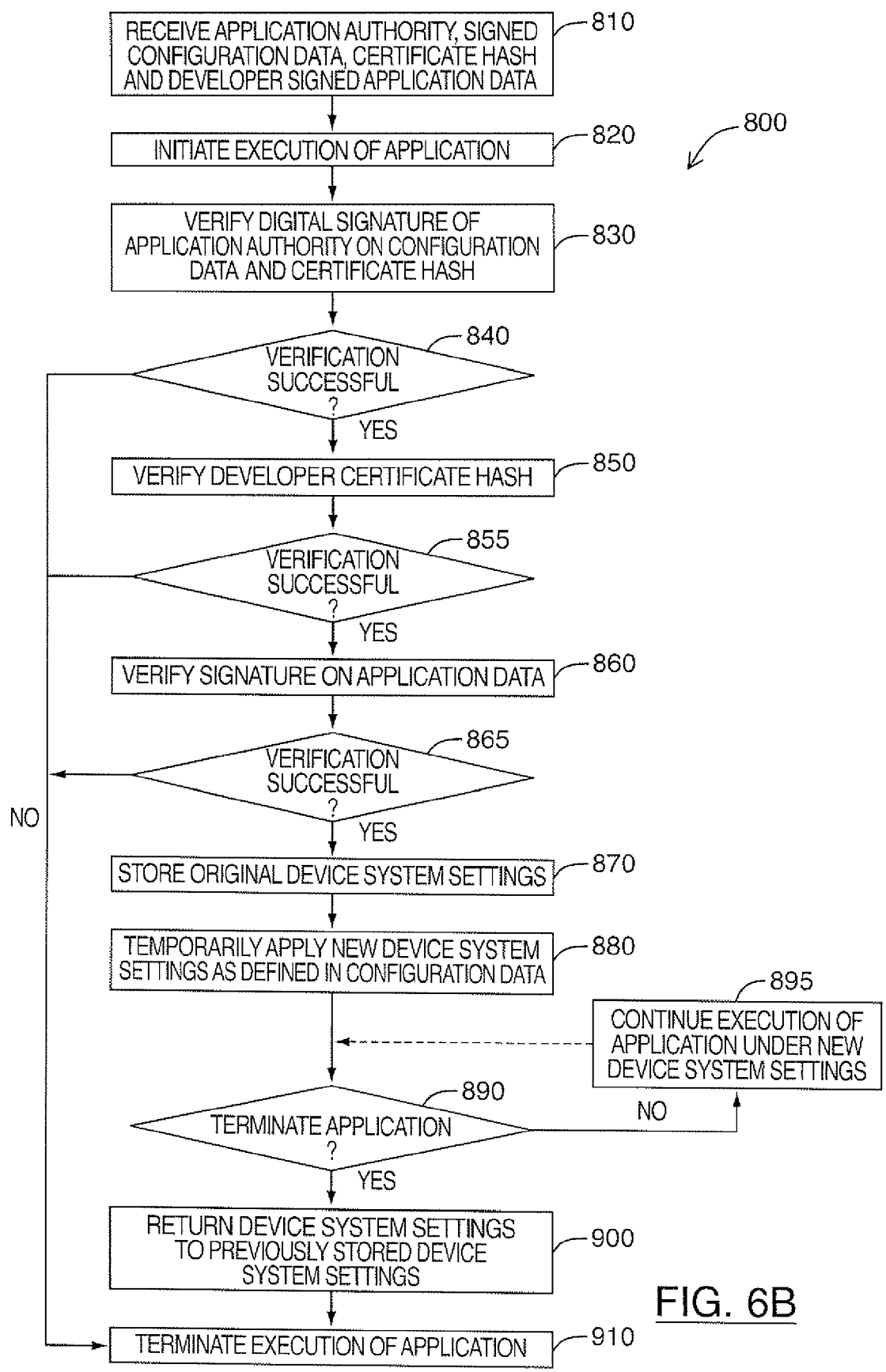
FIG. 6B is a flowchart diagram illustrating a process performed at a computing device in accordance with a method of controlling system settings in at least one embodiment.

Referring to FIG. 6B, illustrated there generally as 800, is a flowchart diagram illustrating a process performed at a computing device (e.g. mobile device 100) in accordance with a method of controlling system settings in at least one embodiment.

At 810, configuration data and a hash of an application developer's certificate that was signed by the application authority is received at the mobile device 100. The application data that was signed by the application developer is also received.

At 820, initiation of the execution of the software application 402 that is to operate in a secure environment is detected. For example, the mobile device 100 may receive a selection of an application icon 402 via a user interface.

In variant embodiments, if the application data received at 810 was a hash or other identifier of an application rather than the application itself, verification that the identifier is associated with the application 402 being executed may also be made before proceeding with further acts of method 800.

In response to the initiation of the execution of application 402, a reconfiguring of device system settings on the mobile device 100 is performed. In some embodiments, the reconfiguring of device system settings comprises verifying at least one digital signature associated with the digitally signed configuration data received at 810.

In at least one embodiment, at 830, mobile device 100 verifies the digital signature of the application authority on the digitally signed configuration data and hash received at 810. The root certificate required to verify the digital signature may be retrieved or may be present on the mobile device 100, and used in the verification.

If the verification is not successful (the 'NO' branch at 840), the application 402 may be terminated at 910. In some alternative embodiments, instead of terminating execution, a warning may be displayed on a user interface of the mobile device 100 to ask the user if execution of the software application should nevertheless continue. Additionally or alternatively, if the digital signature associated with the digitally signed configuration data fails to successfully verify, then an error message may be generated, and at least one of the following acts may be performed: transmitting the error message to the developer device 450, transmitting the error message to the application authority 268, and displaying the error message on a user interface of the mobile device 100. Additionally or alternatively, the application may also be deleted from the computing device. It will be understood that such various additional or alternative acts may be performed whenever verification is not successful, regardless of the type of data being verified. For example, such acts may be performed if the developer hash is not successfully verified at 855, if the signature on the application data is not successfully verified at 865, or at the various verification acts in FIGS. 7B and 8B, discussed below.

If verification is successful (the 'YES' branch at 840), this indicates that the configuration data were approved by the application authority, and that the configuration data and hash have not been modified since they were signed.

In variant embodiments, the validity of the certificate used to verify the digital signature on the configuration data may also be verified before proceeding with further acts of method 800. This may be performed by, for example, verifying the trust status, expiration status and/or the revocation status of the certificate (the revocation status being verified against a Certificate Revocation List or via an Online Certificate Status Protocol, for example).

The mobile device 100 may then be configured to separate out the plaintext version of the hash from the signed data received at 810, and perform additional verifications.

For example, the mobile device 100 may then proceed to verify the hash at 850. To verify the hash, the mobile device 100 may retrieve a digital certificate associated with the application developer from which the application data received at 810 originates (e.g., the same certificate that has the public key that matches the private key issued to the developer at 610, FIG. 6A). This digital certificate is hashed, applying the same hash function that was applied at the application authority 268 at 670 (FIG. 6A). The resulting hash is compared with the signed hash received at 810. If the two hashes match, then the identity of the application developer is verified (the 'YES' branch at 855), and the mobile device 100 may proceed to verify the signature on the application data at 860. However, if the two hashes do not match, then the verification is not successful (the 'NO' branch at 855), and the application may be terminated at 910. As indicated above (with respect to act 840 in FIG. 6B), additional or alternative error processing for may be performed when verification fails.

At 860, the mobile device 100 verifies the digital signature on the application data received at 810. This act is performed to verify that the application data originated from the application developer and/or was not modified during transit. This process may be similar to any of various appropriate methods of verifying application data (e.g., verification acts in existing code-signing methods). In some embodiments, the public key in the certificate used when digitally signing the application data matches the certificate that was hashed to create the certificate hash at 670 of FIG. 6A. In such cases, the developer's certificate may hold the public key associated with the private key issued by the application authority at 610.

If the verification is successful (the 'YES' branch at 865), then the flow of the method proceeds to 870. Otherwise, if the verification at 865 is not successful (the 'NO' branch at 865), then the mobile device 100 may terminate the execution of the software application 402 (at 910). As indicated above (with respect to act 840 in FIG. 6B), additional or alternative error processing may be performed when verification fails.

In variant embodiments, the method may also comprise verifying that the certificate used to verify the digital signature associated with a digitally signed application or application data (at 860) is valid, before proceeding with further acts of method 800. This may be performed by, for example, verifying the trust status, expiration status, and/or the revocation status of the certificate (the revocation status being verified against a Certificate Revocation List or via an Online Certificate Status Protocol, for example). If the certificate that the application data was signed with has been revoked, an error message may be displayed in a user interface to inform the user of the mobile device 100 that the application is no longer valid, and optionally, that the application developer (or application vendor) should be contacted. In this manner, if an application authority has concerns about the security of certain applications that may be executing on the mobile device 100, permissions given to an application to control device system settings may be revoked by revoking the application developer's certificate.

In variant embodiments, the order of the verification acts performed at 830 to 865 may be altered. For example, the sequence may start with verifying the signature on the application data at 860 first before determining if any configuration data is available for the application data. If there is configuration data for the application data, the acts of verifying the digital signature of the application authority on the configuration data and certificate hash at 830, and verifying the developer certificate hash at 850 may proceed afterwards.

After the one or more verifications described are successfully completed, acts 870 to 900 may be performed to temporarily enforce new device system settings, if necessary, according to the configuration data as approved by the application authority.

As the device system settings may be temporarily modified during the execution of the software application initiated at 820, the state of device system settings in force before they are changed may need to be recorded. This allows each device system setting to be returned to its previous state before the modifications, after the execution of the software application is terminated. Accordingly, at 870, for each of at least one new system setting identified by the configuration data, data identifying the corresponding device system setting before modification (hereinafter "original device system setting") is stored on the mobile device 100. At 880, the mobile device 100 temporarily applies each of at least one new device system setting as defined by the configuration data, to secure the operating environment for the application being executed. In the financial services application example discussed above, the new device system settings may restrict the network communications or screen capture operations from being accessed on the mobile device 100. For instance, this may ensure that any sensitive financial information entered on the device is not surreptitiously captured.

In some embodiments, if a new device system setting is associated with a lower level of security than the corresponding original device system setting, the original device system setting may be maintained to ensure greater security is maintained. Therefore, "applying" a new device system setting may comprise not changing the corresponding original device system setting if the corresponding original device system setting is higher (i.e., more restrictive) than the new device system setting identified in the configuration data. In these embodiments, this better ensures that security levels are only elevated. If the mobile device 100 is already providing a higher (i.e., more restrictive) level of security with respect to a particular attribute, the level of security will not be lowered to match the setting identified in the configuration data associated with the particular application. At least some acts associated with these embodiments where only more restrictive system settings are enforced may also be described in greater detail with respect to FIG. 9 below.

The application 402 may then continue to execute in the secure operating environment with the new device system settings applied at 895, until the execution of the software application terminates, as may be detected at 890.

The new device system settings will be maintained during the execution of the software application, even if the corresponding original device system setting did not change. For example, if an item such as Bluetooth was turned off prior to the execution of the software application, turning on Bluetooth during the execution of the software application will not be permitted where it is indicated in the configuration data associated with the application that Bluetooth may be accessed during execution.

As a further example, if a browser is launched when executing the application, the device may permit the browser to access certain pre-defined uniform resource locators (URLs), and options to navigate elsewhere or browser options to modify system settings identified by the configuration data associated with the application may be hidden or made inactive.

Upon termination of the application 402 (the 'YES' branch at 890), the mobile device restores the device system settings that had been modified at 880, to the corresponding original device system settings as stored at 870. It will be understood that an application 402 may be terminated for a variety of reasons. For example, the device might receive a command to exit the application 402 or close an associated browser, or the application 402 may be terminated by the operating system on the mobile device 100 (e.g., if the application 402 is non-responsive, or some other termination triggering event has occurred).

As previously noted, the embodiments described with reference to FIGS. 6A and 6B do not require the application data itself to be approved by the application authority when the configuration data submitted by the application developer is approved. This may allow for the approved configuration data to be re-used and associated with more than one application authored or otherwise provided by the application developer. This may be more efficient for the application developer, for example, if the application developer produces a suite of applications 402 (e.g., a suite of financial services applications), where all of the applications are to be executed in a similar secure operating environment.

Figure 7A:
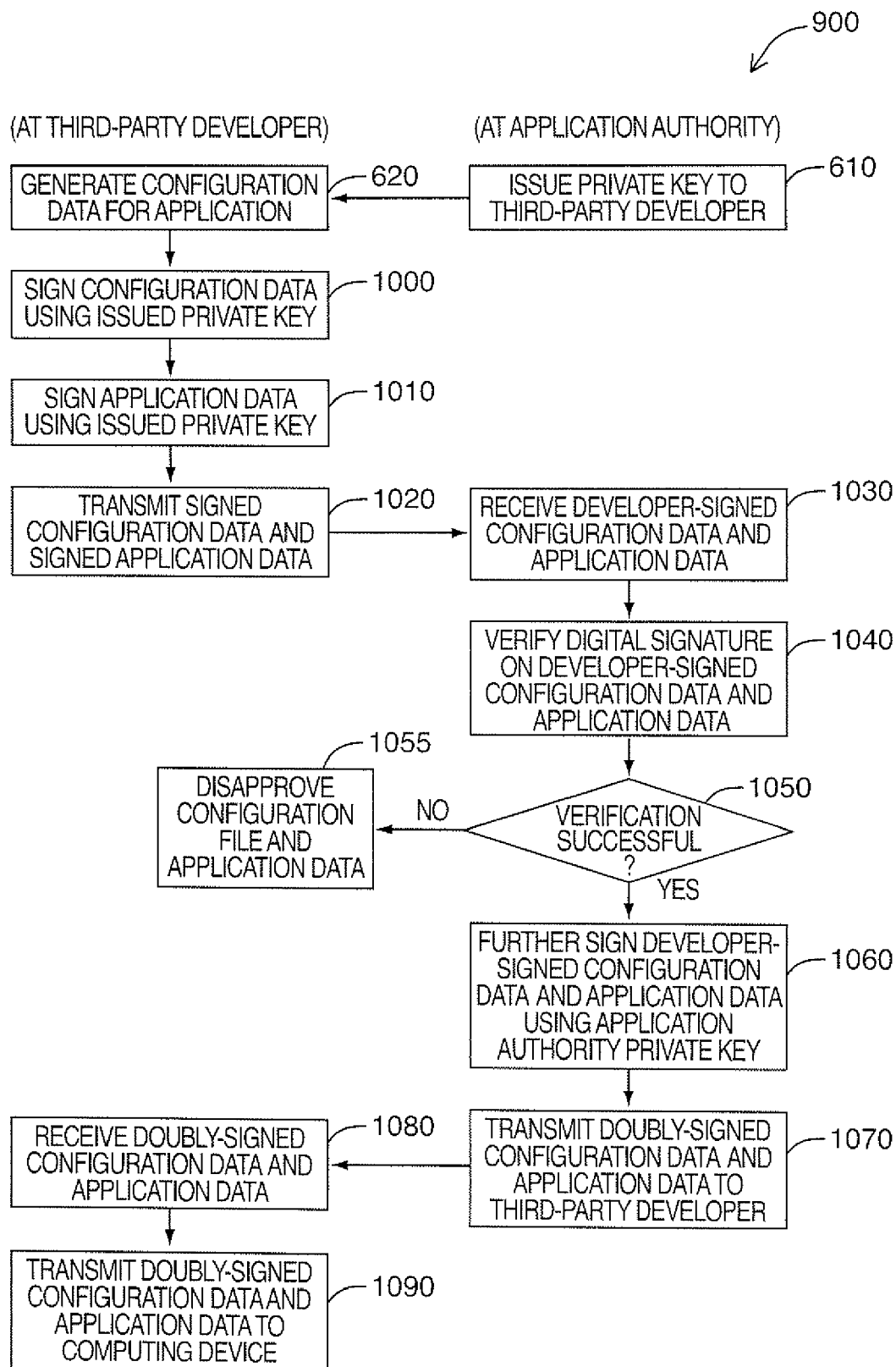
FIG. 7A is a flowchart diagram illustrating a process for providing configuration data for a software application executable at a computing device in accordance with at least one embodiment.
Figure 7B:
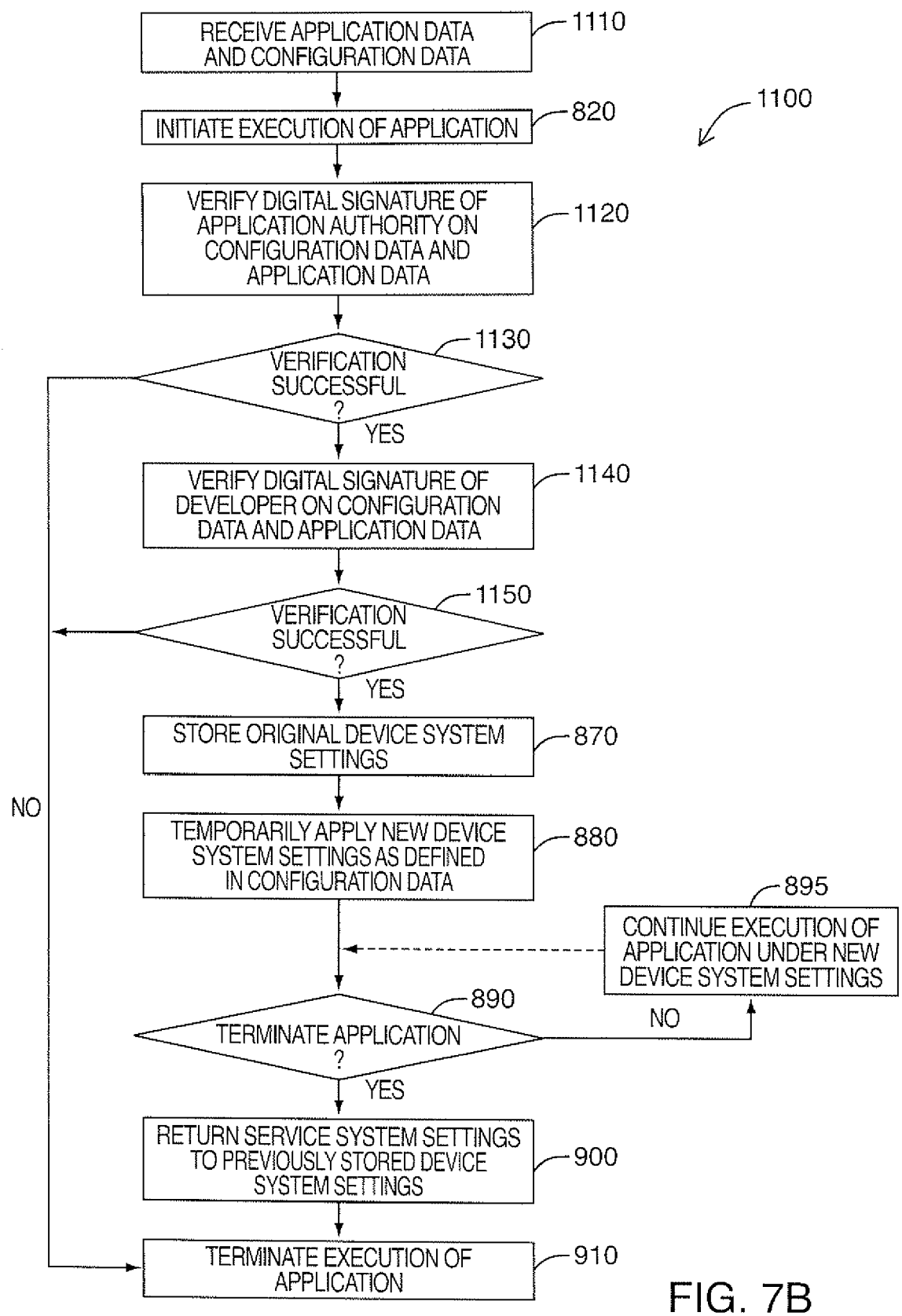
FIG. 7B is a flowchart diagram illustrating a process performed at a computing device in accordance with a method of controlling system settings in at least one embodiment.

Referring now to FIG. 7A, a flowchart diagram is shown generally as 900, illustrating a process for providing configuration data for an application executable at a computing device (e.g. mobile device 100) in which application data and configuration data are signed by both an application developer at a developer device 450 and an application authority 268, in accordance with at least one embodiment. FIG. 7B illustrates a flowchart diagram of a corresponding process performed at a mobile device 100 in accordance with a method of controlling system settings in at least one embodiment.

For ease of exposition, where acts are similar or analogous to acts described earlier with reference to FIGS. 6A and 6B, similar reference numerals have been used, and the reader is directed to the earlier parts of the present description for additional details.

As discussed above, an application authority 268 issues (at 610) a private key to the application developer and transmits the key to the developer device 450 (FIG. 4). At 620, the application developer generates configuration data for the application 402 (FIG. 4).

At 1000, the developer device 450 digitally signs the configuration data associated with the application 402 using the private key issued to the application developer by the application authority 268 at 610, and appends a generated digital signature to the configuration data.

At 1010, the developer device 450 digitally signs the application data (which may be the actual application 402 itself, or a hash of the application 402 or other identifier uniquely identifying the application 402) using the issued private key.

In some embodiments, the configuration data and the application data signed at 1000 and 1010 respectively need not be separately signed. For example, the configuration data may be appended to the application data, and collectively digitally signed using the issued private key.

At 1020, the digitally signed configuration data and digitally signed application data (hereinafter "developer-signed" configuration data and application data respectively) are transmitted to the application authority 268. The signed configuration data and signed application data are received by the application authority 268 at 1030 for approval.

At 1040, the application authority verifies the digital signature of the developer-signed configuration data and application data, to confirm that the configuration data and application data originated from the application developer and/or was not modified during transit.

If the verification is successful (the 'YES' branch at 1050), the application further signs the developer-signed configuration data and application data using the application authority's own private key, at 1060, resulting in the configuration data and the application data being "doubly-signed": once resulting in an 'inner-level' signature of the application developer generated at the developer device 450, and twice when an 'outer-level' signature is then generated by the application authority 268.

In variant embodiments, instead of doubly-signing the developer-signed configuration data and application data, the application authority may replace the signature of the developer by signing the configuration data and application data directly. In such embodiments, the configuration data and application data may be extracted from the developer-signed information received at 1030 so that it can be directly signed by the application authority 268. This signed data may then be transmitted back to the application developer at 1070 for transmitting to the computing device at 1090 (as discussed below). Optionally, this signed data may be re-signed by the application developer to form doubly-signed configuration data and application data (except, in these embodiments, the 'inner signature' would be from the application authority and the 'outer signature' would be from the application developer).

Although the term "doubly-signed" is used herein, it will be understood that the configuration data and application data may be signed more than twice. Accordingly, the terms "doubly-signed" and "multiply-signed" may be used interchangeably. The additional signatures may originate from the application developer, the application authority, or a third-party. For example, the configuration data and application data may be transmitted to one or more third-party devices that may further sign the configuration data and application data, in addition to the signing performed by the application authority 268 and/or the developer device 450. Such embodiments may allow third-party devices (e.g., a third-party software security organization) to also indicate approval of the configuration data and application data. It will be understood that the signing performed by any of these devices (and the corresponding verification performed by the computing device, discussed below) may be performed in any order, depending on the particular implementation.

If the verification is not successful (the 'NO' branch at 1050), the application authority 268 disapproves the configuration file and application data at 1055. This may result in a notification being sent to the developer device to ask for retransmission. Without approval from the application authority 268, the mobile device 100 may not allow the application 402 to execute if the application 402 is eventually transmitted to the mobile device. In alternative embodiments, however, the mobile device 100 may prompt the user to make an exception to nevertheless allow execution at the mobile device 100.

At 1070, the application authority 268 transmits the doubly-signed configuration data and application data to the developer device 450, which is then received by the application developer at 1080, and subsequently transmitted to the mobile device 100 at 1090. In some embodiments, the application authority may not send the signed bundle back to the developer, but instead, may transmit it (or offer it for download) to a mobile device directly for installation thereon.

Referring to FIG. 7B, shown there is a flowchart diagram illustrating a process performed at a computing device in accordance with a method of controlling system settings in at least one embodiment.

At 1110, the doubly-signed application data and configuration data (e.g. as transmitted at 1090 of FIG. 7A) is received at a mobile device 100.

As in FIG. 6B, initiation of the execution of the software application 402 that is to operate in a secure environment is detected at 820. For example, the mobile device 100 may receive a selection of an application icon 402 via a user interface. In variant embodiments, if the application data received at 1110 was a hash or other identifier of an application rather than the application itself, verification that the identifier is associated with the application 402 being executed may also be made before proceeding with further acts of method 1100.

In response to the initiation of the execution of application 402, a reconfiguring of device system settings on the mobile device 100 is performed. The reconfiguring of device system settings may comprise verifying at least one digital signature associated with the digitally signed configuration data received at 1110.

In at least one embodiment, at 1120, the mobile device 100 verifies the digital signature of the application authority 268 with respect to the 'outer-level' signature of the signed configuration data and application data, which was generated by the application authority at 1060 in FIG. 7A. This act is performed to confirm that the application data and the configuration data were approved by the application authority and has not been modified since.

The verification at 1120 may be user-initiated, or automatically triggered upon the initial execution of the software application 402. Verification of the certificate of the application authority if the application authority is not trusted may also be performed. The root certificate required to ultimately verify the 'outer-level' signature may be retrieved or may be present on the mobile device 100, and used in the verification. In various embodiments, the application authority may also be a certificate authority that issues the certificate of the application authority. In such embodiments, the certificate for the application authority may be verified by referencing the root certificate associated with the certificate for the application authority. Alternatively, the application authority may be a source that is trusted by the mobile device 100, and the certificate received from the application authority may be self-signed.

If the verification is not successful (the 'NO' branch at 1130), then the application 402 terminates execution at 910. As indicated above (with respect to act 840 in FIG. 6B), additional or alternative error processing may be performed when verification fails. If the verification is successful (the 'YES' branch at 1130), then at 1140, the mobile device 100 proceeds to verify the 'inner-level' signature as generated by the application developer (see e.g. acts 1000-1010 of FIG. 7A). This verifies that the application data and configured data originated from the application developer and/or has not been modified in transit. In some instances, where the application authority replaces the signature of the developer (e.g., where the application authority signs the configuration data and application data directly as opposed to signing the developer-signed configuration data and application data, as discussed above), the verification of the "inner-level" signature may be omitted.

In variant embodiments, the method may also comprise verifying that the certificate used to verify one or both of the digital signatures associated with digitally signed configuration data or application data (at 1000, 1010) is valid, before proceeding with further acts of method 1100. This may be performed by, for example, verifying the trust status, expiration status, and/or the revocation status of the certificate (the revocation status being verified against a Certificate Revocation List or via an Online Certificate Status Protocol, for example). If the certificate that the configuration data and application data was signed with has been revoked, an error message may be displayed in a user interface to inform the user of the mobile device 100 that the application is no longer valid, and optionally, that the application developer (or application vendor) should be contacted. In this manner, if an application authority has concerns about the security of certain applications that may be executing on the mobile device 100, permissions given to an application to control device system settings may be revoked by revoking the application developer's certificate.

If verification of the digital signature of the application developer is not successful (the 'NO' branch at 1150), the application 402 terminates execution at 910. As indicated above (with respect to act 840 in FIG. 6B), additional or alternative error processing may be performed when verification fails. If the verification is successful (the 'YES' branch at 1150), then acts 870 to 900 may be performed to temporarily enforce new device system settings, if necessary, according to the configuration data as approved by the application authority.

As discussed above, the order of signatures in doubly-signed configuration data and application data may be different, in different embodiments. It will be understood that verification of any such signatures will generally be performed in the reverse order in which the configuration data and application data was signed.

With respect to at least one embodiment described with reference to FIGS. 7A and 7B, it is noted that the application data and the configuration data may be bundled together to be signed at both the developer device 450 and the application authority 268. This configuration may provide enhanced security by ensuring that the approved configuration data is only to be used with application 402 that it is bundled with. In some implementations, the application authority 268 may also review the application data before approving the configuration data, or the application data may comprise a hash of the application to be executed to provide some confidentiality for the contents of the application while still tying together a particular application with the approved configuration data.

However, these embodiments may require that the configuration data approval process be repeated for any different applications, or in some cases, each new version of a given application, which is to be executed on the mobile device 100. While this may provide the application authority with greater control over the applications that are to be executed on the mobile device, this may cause greater inconvenience to the application developer in certain situations.

Figure 8A:
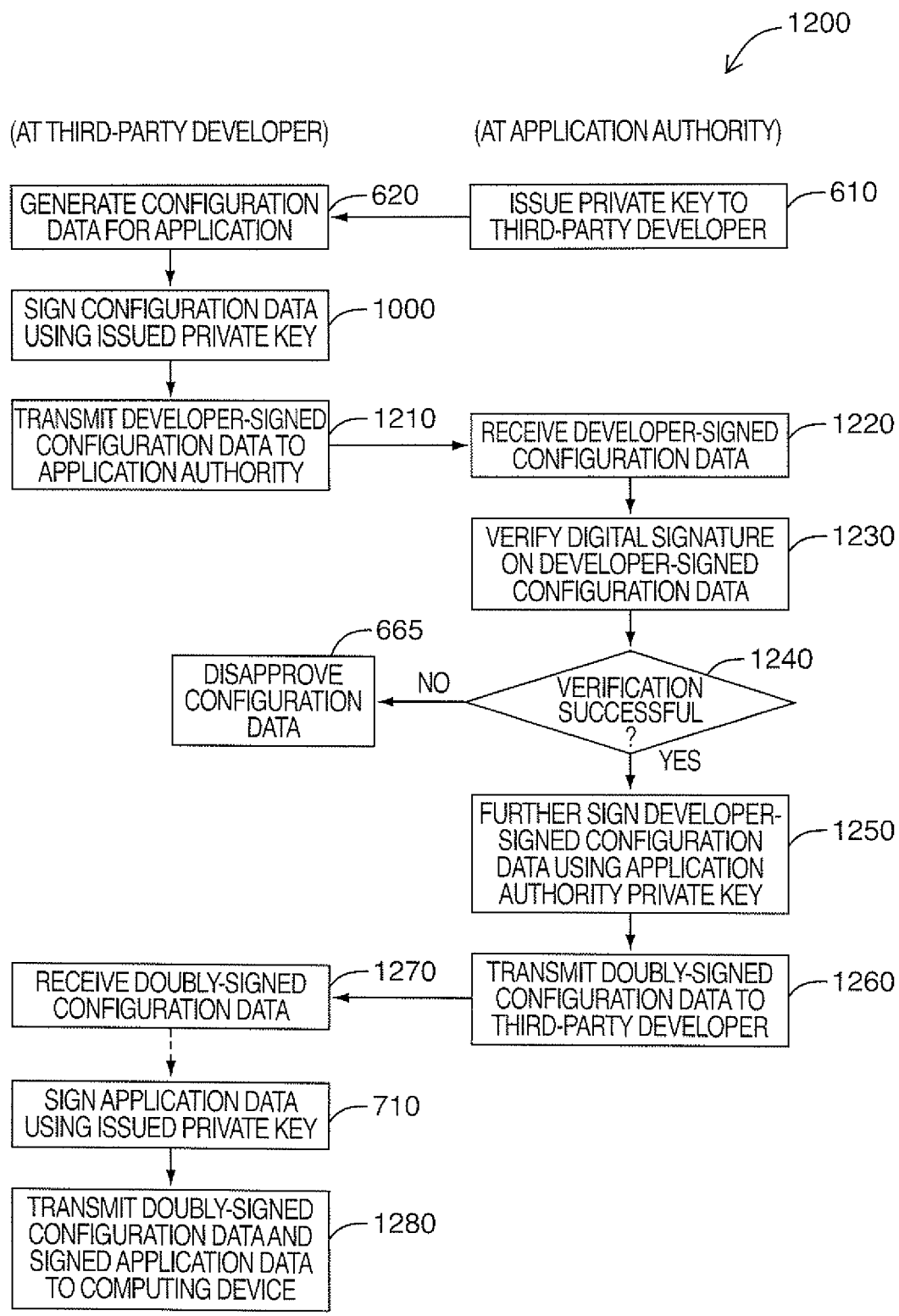
FIG. 8A is a flowchart diagram illustrating a process for providing configuration data for a software application executable at a computing device in accordance with at least one embodiment.
Figure 8B:
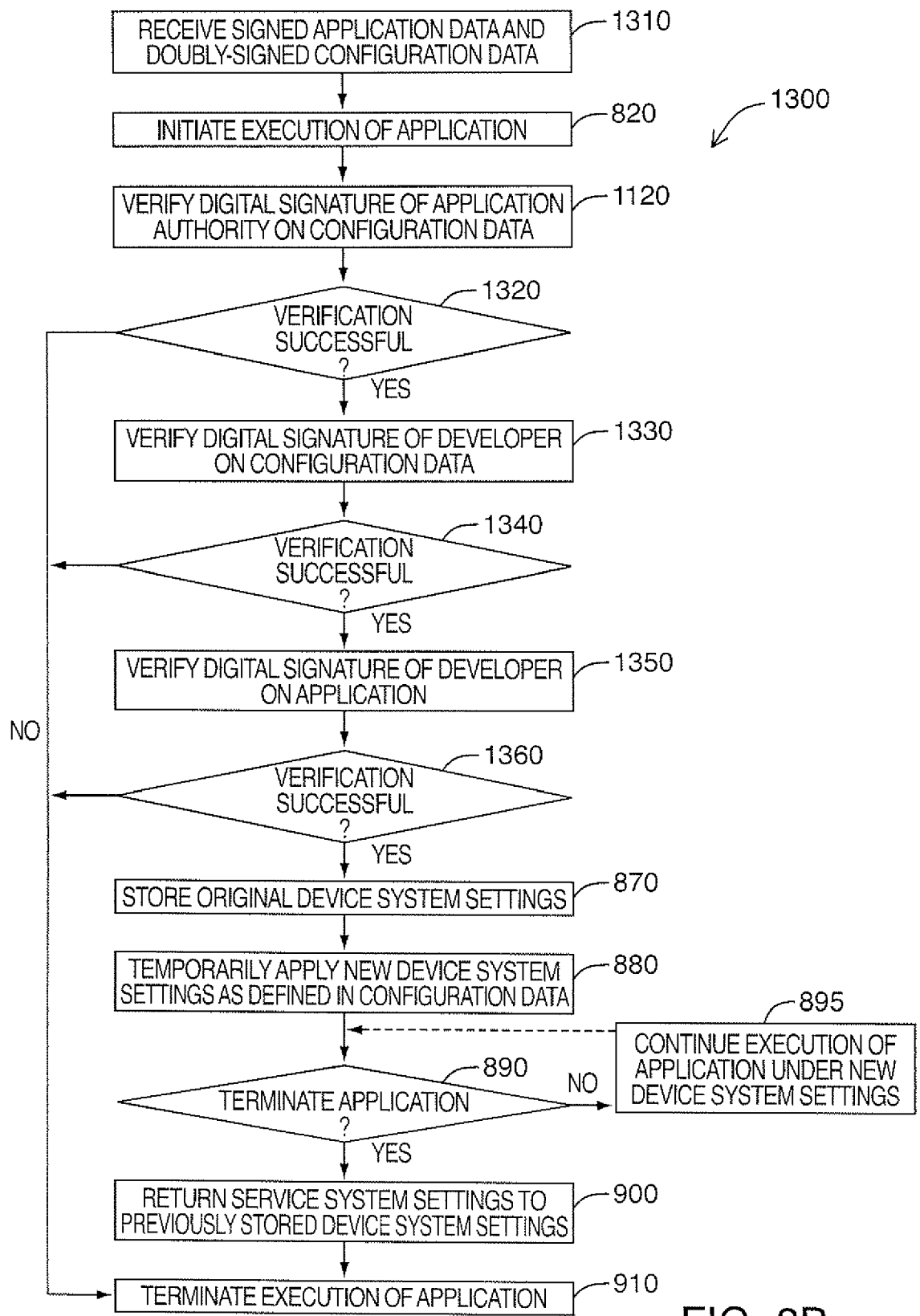
FIG. 8B is a flowchart diagram illustrating a process performed at a computing device in accordance with a method of controlling system settings in at least one embodiment.

Referring now to FIG. 8A, shown there generally as 1200, is a flowchart diagram illustrating a process for providing configuration data for an application 402 executable at a computing device in which only the configuration data is signed at both the application developer 450 and the application authority 268, in accordance with at least one embodiment. FIG. 8B is a flowchart diagram illustrating a corresponding process performed in accordance with a method of controlling system settings in at least one embodiment.

For ease of exposition, where acts are similar or analogous to acts described earlier with reference to FIGS. 6A and 6B or FIGS. 7A and 7B, similar reference numerals are used, and the reader is directed to the earlier parts of the present description for additional details.

As discussed above with respect to FIG. 6A, an application authority issues a private key to the application developer by transmitting to the developer device 450 (FIG. 4), at 610. At 620, the application developer then generates configuration data for the application 402 (FIG. 4). Also, similar to FIG. 7A, at 1000, the application developer signs the generated configuration data using the issued private key, and appends the digital signature to the configuration data (to produce "developer-signed" configuration data).

At 1210, the developer device 450 transmits the developer-signed configuration data (without application data, unlike in FIG. 7A) to the application authority 268. The developer-signed configuration data is received at the application authority at 1220.

At 1230, the application authority 268 verifies the digital signature of the received developer-signed configuration data, to verify that the configuration data originated from the application developer and/or was not modified in transit.

Optionally, the validity of the certificate associated with the public key of the digital signature can also be verified to enhance security.

If verification of the digital signature is not successful (the 'NO' branch at 1240), the application authority 268 disapproves the configuration data at 665. As noted above with respect to act 1055 in FIG. 7A, the application authority may send a notification to the developer to ask for retransmission. If the verification is successful (the 'YES' branch at 1240), the application authority 268 then further signs the developer-signed configuration data using the application authority's own private key. The resultant configuration data is therefore "doubly-signed": once resulting in an 'inner-level' signature of the application developer generated at the developer device 450, and twice when an 'outer-level' signature is then generated by the application authority 268.

Similar to the embodiments discussed above with respect to FIG. 7A, in some embodiments, the application authority 268 may extract the configuration data from the developer-signed configuration data received at 1220 and sign the configuration data directly (in effect, replacing the signature of the developer). Also similar to the embodiments discussed above with respect to FIG. 7A, doubly-signed configuration data may be further signed.

At 1260, the doubly-signed configuration data is transmitted back to the developer device 450. The signed configuration data is then received at the developer device at 1270.

After the application developer has authored application data for transmission to the mobile device 100, at 710, the application developer digitally signs the application data using the private key issued to the application developer by the application authority 268 at 610. The digital signature that is generated as a result of the digital signing is then appended to the application data. In various embodiments, the signing of the application data may be performed during different stages of the approval of the configuration data. For example, application data may be signed by the developer before the developer signs the configuration data at 1000, or the application data may be signed while the application authority is signing the configuration data (i.e., after the developer has already transmitted the signed configuration data to the application authority at 1210, but before it has received the signed configuration data from the application authority at 1270).

The application data may comprise the actual application itself to be executed on the mobile device 100, or it may comprise a hash of the application, or some other identifier that uniquely identifies the application 402, which has or will otherwise be made available for execution on the mobile device 100. For ease of reference, the discussion herein refers to a single hash for an application. However, it will be understood that an application could be represented by multiple hashes. For example, an application could be broken into multiple parts (e.g., multiple files that are each less than a pre-determined file size), and each part may be individually hashed.

At 1280, the application developer transmits the signed configuration data and the separately signed application data to the mobile device 100.

Referring to FIG. 8B, shown there generally as 1300, is a flowchart diagram illustrating a process performed in accordance with a method of controlling system settings in at least one embodiment.

At 1310, the doubly-signed configuration data and separately signed application data (e.g. as sent at 1280 of FIG. 8A) is received at the mobile device 100. As in FIGS. 6B and 7B, at 820, initiation of the execution of the software application 402 that is to operate in a secure environment is detected. For example, the mobile device 100 may receive a selection of an application icon 402 via a user interface.

In variant embodiments, if the application data received at 1310 was a hash or other identifier of an application rather than the application itself, verification that the identifier is associated with the application 402 being executed may also be made before proceeding with further acts of method 1300.

In response to the initiation of the execution of application 402, a reconfiguring of device system settings on the mobile device 100 is performed. The reconfiguring of device system settings may comprise verifying at least one digital signature associated with the digitally signed configuration data received at 1110.

In at least one embodiment, the mobile device 100 may then proceed to verify the doubly-signed configuration data that is digitally signed with an 'outer-level' signature generated by the application authority 268 and an 'inner-level' signature generated by the application developer.

As in FIG. 7B, at 1120, the mobile device 100 verifies the 'outer-level' signature of the application authority 268 used to digitally sign the configuration data. This is done to confirm that the configuration data has been approved by the application authority. If verification is not successful (the 'NO' branch at 1320), the application 402 terminates execution at 910. As indicated above (with respect to act 840 in FIG. 6B), additional or alternative error processing may be performed when verification fails. If the verification is successful (the 'YES' branch at 1320), then the mobile device 100 proceeds to verify the 'inner-level' signature of the application developer on the configuration data at 1330. This verification is performed to confirm that the configuration data to be applied at the mobile device 100 originated from the application developer and/or has not been modified during transit.

In embodiments where the application authority 268 signs the configuration data directly (instead of the application authority 268 signing the developer-signed configuration data, as discussed above), there may be no 'inner-level' signature to verify.

Similar to variant embodiments discussed above with respect to FIG. 7B, verification of additional signatures may be performed in addition to the verification of the 'outer-level' and 'inner-level' signatures.

If the verification of the application developer's signature on the configuration data is not successful (the 'NO' branch at 1340), the application 402 terminates execution at 910. As indicated above (with respect to act 840 in FIG. 6B), additional or alternative error processing may be performed when verification fails. If the verification of the application developer's signature on the configuration data is successful (the 'YES' branch at 1340), then the mobile device 100 proceeds to verify the digital signature of the developer-signed application data at 1350. This verification is performed to confirm that the application data originated from the application developer and/or has not been modified during transit.

If the verification of the digital signature of the developer-signed application data is not successful (the 'NO' branch at 1360), the application 402 will terminate execution at 910. As indicated above (with respect to act 840 in FIG. 6B), additional or alternative error processing may be performed when verification fails. If the verification is successful (the 'YES' branch at 1360), then acts 870 to 900 may be performed to temporarily enforce new device system settings, if necessary, according to the configuration data as approved by the application authority, as previously described with reference to FIG. 6B.

In variant embodiments, the method may also comprise verifying that one or more certificates used to verify one or more of the digital signatures associated with digitally signed application or application data are valid, before proceeding with further acts 870 to 900. These verifications may be performed by, for example, verifying the trust status, expiration status, and/or the revocation status of a particular certificate (the revocation status being verified against a Certificate Revocation List or via an Online Certificate Status Protocol, for example). If the certificate that was used for digital signing has been revoked, an error message may be displayed in a user interface to inform the user of the mobile device 100 that the application is no longer valid, and optionally, that the application developer (or application vendor) should be contacted. In this manner, if an application authority has concerns about the security of certain applications that may be executing on the mobile device 100, permissions given to an application to control device system settings may be revoked by revoking the application developer's certificate.

Similar to the embodiments described with reference to FIGS. 6A and 6B, the embodiments described with reference to FIGS. 8A and 8B permit configuration data to be approved without requiring application data to be approved. This may allow the allowed configuration data to be used with other applications 402 that the application developer produces (i.e., if the application authority 268 determines that the application developer is a trusted party and wishes to allow other applications 402 produced by the developer to also execute in a particular operating environment), and may enhance convenience for the developer.

In contrast to FIGS. 6A and 6B, FIGS. 8A and 8B relate to embodiments that employ a different manner of associating configuration data with an application developer. In contrast to the embodiments described with reference to FIGS. 6A and 6B where the configuration data was associated with the application developer by having the application authority 268 digitally sign data that included a hash of the application developer's certificate, in embodiments described with reference to FIGS. 8A and 8B, the application developer signs the configuration data at the developer device 450, which is then further signed by the application authority 268. This may provide enhanced security. However, the private key issued from the application authority 268 to the developer device 450 would then need to be made available to the application developer before the developer device 450 can digitally sign and transmit configuration data to the application authority 268 for approval.

In further embodiments, the configuration data for an application may not be signed by the application authority or the developer device, and may instead be authorized by the user or an existing security policy on the mobile device 100.

Figure 9:
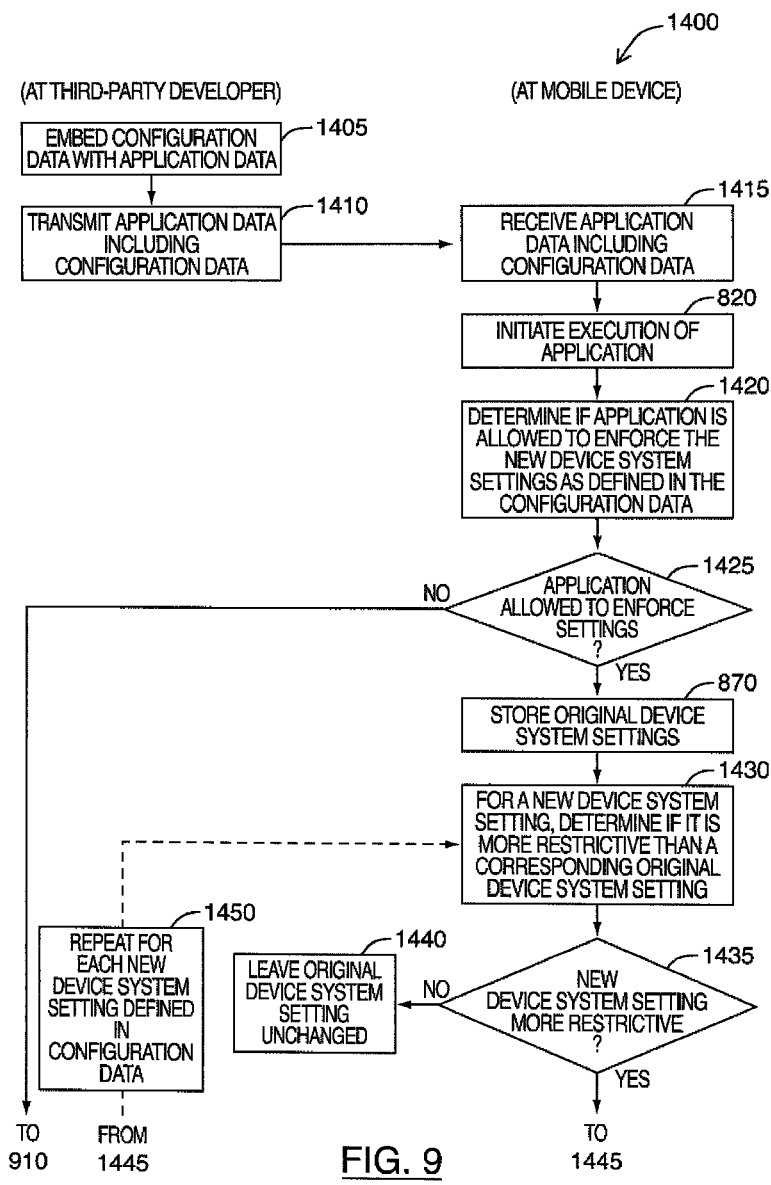
FIG. 9 is a flowchart diagram illustrating a process for providing configuration data for a software application executable at a computing device, and controlling system settings at the computing device according to the configuration data in at least one embodiment.
Figure 9:
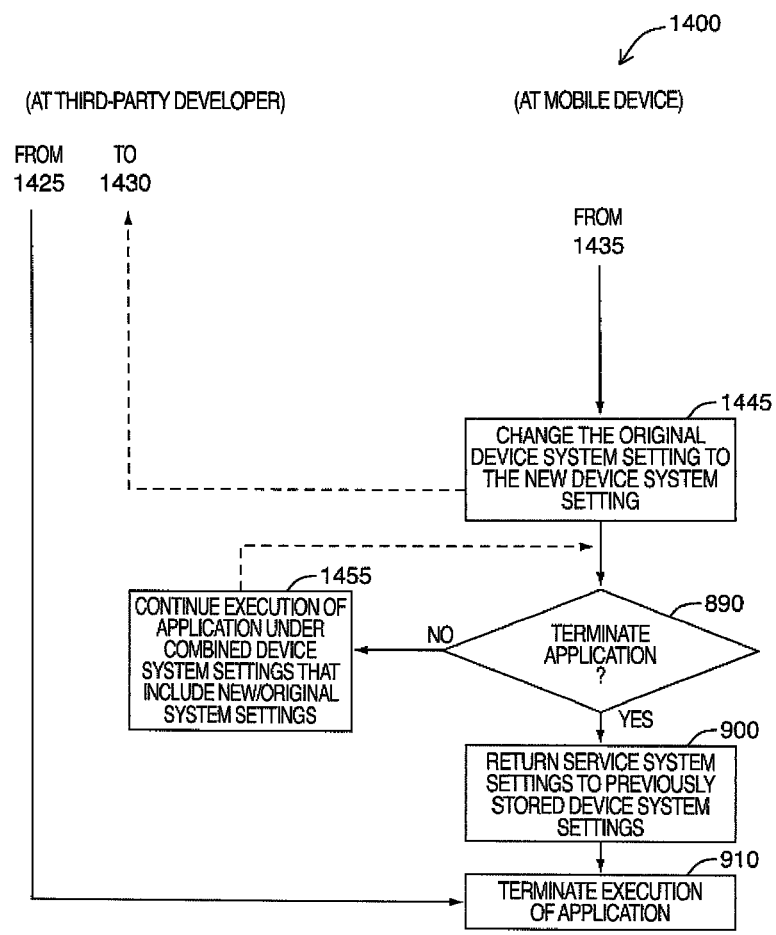

Referring to FIG. 9, shown there is a flowchart diagram illustrating a process for providing configuration data for a software application executable at a computing device, and controlling system settings at the computing device according to the configuration data in at least one embodiment.

For ease of exposition, where acts are similar or analogous to acts described earlier with reference to the figures above, similar reference numerals are used, and the reader is directed to the earlier parts of the present description for additional details.

At 1405, the configuration data is embedded with the application data at the developer device. This may be performed in a variety of ways. For example, the configuration data may be provided within the binary executable of the application. Additionally or alternatively, the configuration data may be linked to the application, and the two may be packaged together when distributed. Such linking may occur if, for example, the application programmatically accesses the configuration data by invoking an API call, and such packaging may be performed through the use of a data compression or archival format such as a 'zip' file format.

At 1410, the developer device transmits the application data with the embedded configuration data to the mobile device. This data is then received at the mobile device (at 1415). Before transmission, the application data (with the configuration data embedded therein) may be digitally signed. Unlike the embodiments described in FIGS. 6A, 7A and 8A, the configuration data itself is not independently signed or approved by the application authority 268.

As in FIGS. 6B, 7B and 8B, at 820, initiation of the execution of the software application 402 that is to operate in a secure environment is detected. For example, the mobile device 100 may receive a selection of an application icon 402 via a user interface.

At 1420, the mobile device determines if the application is allowed to enforce the new device system settings defined in the configuration data. This may be performed, for example, by referencing security policy settings that are set by a system administrator and/or the user of the mobile device. If such settings indicate that the software application is allowed (or disallowed) to enforce the one or more new system settings defined in the configuration data, then the mobile device may allow (or disallow) the new system settings to be enforced. Additionally or alternatively, the mobile device may display a prompt in a user interface of the mobile device 100 to ask the user if the application for which execution has been initiated is allowed to enforce the new device system settings.

If the application is not allowed to enforce the new device system settings (the 'NO' branch at 1425), execution of the software application may be terminated at 910. Similar to the scenarios discussed above when a digital signature cannot be verified, additional error processing may be performed. For example, the mobile device 100 may transmit an error message to the developer device 450 indicating that a secure environment for the application could not be established, or an error message on a user interface of the mobile device 100 may be displayed indicating that the application requires the ability to modify system settings before it can operate.

If the application is allowed to enforce the new device system settings (the 'YES' branch at 1425), the mobile device may then proceed to store the original device system settings (at 870) and temporarily apply new device system settings in the configuration data (at 1430 to 1450).

As discussed above with regard to act 880 in FIG. 6B, some original device system setting attributes may be more restrictive (i.e., more secure) than a corresponding new device system setting attribute defined in the configuration data. As such, it may be desirable to not change such original system settings to the new device system settings so as to prevent the security of the mobile device 100 from being downgraded. This may provide enhanced security particularly if the configuration data has not been signed and/or pre-approved by the application authority. Acts 1430 to 1450 describe such embodiments in greater detail, and may be performed as a part of act 880 described in FIGS. 6B, 7B and 8B above.

At 1430, for each new device system setting defined in the configuration data, the mobile device determines if it is more restrictive than a corresponding original device system setting. If the system setting is not more restrictive (the 'NO' branch at 1435), the mobile device may leave the original device system setting unchanged (at 1440). If the system setting is more restrictive (the 'YES' branch at 1435), the mobile device may proceed to change the original device system setting to the new device system setting (at 1445).

For example, if the mobile device is already operating under a security policy that has an original device system setting that requires a high-level of encryption strength when performing network communications, and the configuration data for the application has a new device system setting that only requires a medium-level of encryption strength, the mobile device 100 can determine that the new device system setting is not more restrictive than the original device system setting, and leave the original device system setting unchanged. This will result in a high-level of encryption strength (i.e., the original device system setting) still being required when the application is operating.

At 1450, acts 1430 to 1445 may be repeated for each new device system setting defined in the configuration data.

After all the new device system settings in the configuration data have been processed, the mobile device 100 can be considered as enforcing a set of combined device system settings (i.e., a combination of the new and original device system settings) that reflect the most restrictive set of system settings for the mobile device. It will be understood that "combined device system settings" may include scenarios where the system settings are not actually a combination. That is, situations where every new device system setting is more restrictive (i.e., such that all the original system settings are changed), and where no new device system setting is more restrictive (i.e., where none of the original system are changed).

Similar to act 895 in FIGS. 6B, 7B, and 8B, at 1455, the application 402 may continue execution under the combined device system settings until the application terminates, as may be detected at 890.

Similar to act 900 in FIGS. 6B, 7B, and 8B, when the application is terminated (the 'YES' branch at 890), the mobile device 100 returns the system settings to the previously stored device system settings.

In alternate embodiments, the mobile device 100 may store whether or not a new device system setting is more restrictive than an original device system setting when making that determination at 1435. In such embodiments, the mobile device 100 may be made more efficient at 900 by only restoring the device system settings that were changed at 1445.

The mobile device then terminates execution of application at 910.

Some of the acts of one or more methods described herein may be provided as software instructions, stored on computer-readable storage media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of one or more methods described herein may be provided as executable software instructions stored in transmission media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The present disclosure makes reference to a number of embodiments. However, it will be understood by persons skilled in the art that other variants and modifications may be made without departing from the scope of the embodiments defined in the claims appended hereto.

For example, in some embodiments where all parties are trusted, the verification of a digital signature may just involve checking the integrity of the signed data (i.e., ensuring that the data has not been altered in transit), without performing any authentication of the signed data (i.e., without ensuring that the data did in fact originate from the purported sender). In such embodiments, the authentication of the signed data may be performed simply by verifying a self-signed certificate that is signed by the trusted developer, for example.

The invention claimed is:

1. A method of controlling system settings of a computing device, the method comprising:
   determining configuration data associated with a software application, the configuration data identifying one or more new system settings to be temporarily enforced on the computing device during an execution of the software application, wherein the configuration data is digitally signed;
   in response to an initiation of the execution of the software application, determining whether the one or more new system settings are more restrictive than one or more corresponding original system settings; and
   upon determining that the one or more new system settings are more restrictive than the one or more corresponding original system settings:
      reconfiguring the system settings on the computing device, the reconfiguring comprising:
         verifying at least one digital signature associated with the digitally signed configuration data; and
         if the at least one digital signature associated with the digitally signed configuration data successfully verifies, temporarily enforcing the one or more new system settings for a duration of the execution of the software application.

2. The method of claim 1, wherein the temporarily enforcing the one or more new system settings comprises:
   for each of at least one new system setting identified by the configuration data:
      storing data identifying a corresponding original system setting, and
      applying the new system setting;
   continuing the execution of the software application with the one or more new system settings applied, until the execution of the software application terminates;
   detecting termination of the software application; and
   restoring the one or more corresponding original system settings upon the termination of the software application.

3. The method of claim 1, wherein the reconfiguring further comprises verifying that a certificate used to verify the digital signature associated with the digitally signed configuration data is valid, and wherein the temporarily enforcing the one or more new system settings is performed after successfully verifying that the certificate is valid.

4. The method of claim 1, wherein the at least one digital signature associated with the digitally signed configuration data comprises a first digital signature generated at a developer device and a second digital signature generated at an application authority.

5. The method of claim 4, wherein the configuration data is digitally signed at the developer device to produce developer-signed configuration data, and the developer-signed configuration data is digitally signed at the application authority to produce the digitally signed configuration data.

6. The method of claim 1, wherein an identifier that uniquely identifies the software application is provided with the configuration data.

7. The method of claim 6, wherein the identifier that uniquely identifies the software application comprises a hash of the software application.

8. The method of claim 1, wherein the configuration data that is digitally signed is accompanied by developer-identifying data associated with the application.

9. The method of claim 8, wherein the developer-identifying data comprises a signed hash of a developer's certificate.

10. The method of claim 1, wherein the method further comprises detecting the initiation of the execution of the software application.

11. The method of claim 1, wherein the method further comprises receiving the configuration data at the computing device.

12. The method of claim 11, wherein the method further comprises receiving the software application with the configuration data at the computing device.

13. The method of claim 1, wherein the reconfiguring further comprises continuing the execution of the software application with combined system settings that include at least one new system setting and at least one original system setting.

14. The method of claim 1, wherein if the at least one digital signature associated with the digitally signed configuration data fails to successfully verify, then the method further comprises generating an error message and then performing at least one of: transmitting the error message to a developer device, transmitting the error message to an application authority device, and displaying the error message on a user interface of the computing device.

15. The method of claim 1, wherein the software application is digitally signed, wherein the reconfiguring further comprises verifying a digital signature associated with the digitally signed software application, and verifying that a certificate used to verify the digital signature associated with the digitally signed software application is valid, and wherein the temporarily enforcing the one or more new system settings is performed after successfully verifying the digital signature associated with the digitally signed software application, and after successfully verifying that the certificate is valid.

16. A computing device comprising:
a processor and a memory, the memory storing executable instructions that, when executed by the processor, cause the processor:
to determine configuration data associated with a software application, the configuration data identifying one or more new system settings to be temporarily enforced on the computing device during an execution of the software application, wherein the configuration data is digitally signed;
in response to an initiation of the execution of the software application, to determine whether the one or more new system settings are more restrictive than one or more corresponding original system settings; and
upon a determination that the one or more new system settings are more restrictive than the one or more corresponding original system settings:
to reconfigure system settings on the computing device, the reconfiguring comprising:
verifying at least one digital signature associated with the digitally signed configuration data; and
if the at least one digital signature associated with the digitally signed configuration data successfully verifies, temporarily enforcing the one or more new system settings for a duration of the execution of the software application.

17. The computing device of claim 16, wherein the temporarily enforcing the one or more new system settings comprises:
for each of at least one new system setting identified by the configuration data:
storing data identifying a corresponding original system setting, and
applying the new system setting;
continuing the execution of the software application with the one or more new system settings applied, until the execution of the software application terminates;
detecting termination of the software application; and
restoring the one or more corresponding original system settings upon the termination of the software application.

18. The computing device of claim 16, wherein the software application is digitally signed, wherein the reconfiguring further comprises verifying a digital signature associated with the digitally signed software application, and verifying that a certificate used to verify the digital signature associated with the digitally signed software application is valid, and wherein the temporarily enforcing the one or more new system settings is performed after successfully verifying the digital signature associated with the digitally signed software application, and after successfully verifying that the certificate is valid.

19. A computer-readable storage medium comprising instructions that, when executed by a processor of a computing device, cause the processor:
to determine configuration data associated with a software application, the configuration data identifying one or more new system settings to be temporarily enforced on the computing device during an execution of the software application, wherein the configuration data is digitally signed;
in response to an initiation of the execution of the software application, to determine whether the one or more new system settings are more restrictive than one or more corresponding original system settings; and
upon a determination that the one or more new system settings are more restrictive than the one or more corresponding original system settings:
to reconfigure system settings on the computing device, the reconfiguring comprising:
verifying at least one digital signature associated with the digitally signed configuration data; and
if the at least one digital signature associated with the digitally signed configuration data successfully verifies, temporarily enforcing the one or more new system settings for a duration of the execution of the software application.

20. The medium of claim 19, wherein the temporarily enforcing the one or more new system settings comprises:
for each of at least one new system setting identified by the configuration data:
storing data identifying a corresponding original system setting, and
applying the new system setting;
continuing the execution of the software application with the one or more new system settings applied, until the execution of the software application terminates;
detecting termination of the software application; and
restoring the one or more corresponding original system settings upon the termination of the software application.

21. The computer-readable storage medium of claim 19, wherein the software application is digitally signed, wherein the reconfiguring further comprises verifying a digital signature associated with the digitally signed software application, and verifying that a certificate used to verify the digital signature associated with the digitally signed software application is valid, and wherein the temporarily enforcing the one or more new system settings is performed after successfully verifying the digital signature associated with the digitally signed software application, and after successfully verifying that the certificate is valid.

* * * * *